(12) United States Patent
Krishnamoorthy et al.

(10) Patent No.: US 11,533,593 B2
(45) Date of Patent: Dec. 20, 2022

(54) SYSTEM METHOD AND COMPUTER-ACCESSIBLE MEDIUM FOR BLOCKCHAIN-BASED DISTRIBUTED LEDGER FOR ANALYZING AND TRACKING ENVIRONMENTAL TARGETS

(71) Applicant: New York University, New York, NY (US)

(72) Inventors: Saiprasanth Krishnamoorthy, Princeton, NJ (US); Vikram Kapila, West Orange, NJ (US)

(73) Assignee: New York University, New York, NY (US)

( * ) Notice: Subject to any disclaimer, the term of this patent is extended or adjusted under 35 U.S.C. 154(b) by 191 days.

(21) Appl. No.: 16/400,422

(22) Filed: May 1, 2019

(65) Prior Publication Data
US 2019/0342731 A1    Nov. 7, 2019

Related U.S. Application Data

(60) Provisional application No. 62/665,257, filed on May 1, 2018.

(51) Int. Cl.
*H04W 4/46* (2018.01)
*B25J 9/16* (2006.01)
*G05D 1/02* (2020.01)

(52) U.S. Cl.
CPC ............. *H04W 4/46* (2018.02); *B25J 9/162* (2013.01); *B25J 9/1664* (2013.01); *B25J 9/1676* (2013.01); *B25J 9/1697* (2013.01); *G05D 1/0289* (2013.01)

(58) Field of Classification Search
CPC .......... H04W 4/46; B25J 9/162; B25J 9/1664; B25J 9/1676; B25J 9/1697; G05D 1/0289;
(Continued)

(56) References Cited

U.S. PATENT DOCUMENTS

| 5,819,008 A * | 10/1998 | Asama ................. G05D 1/0242 701/1 |
| 2004/0024490 A1* | 2/2004 | McLurkin ............ G05D 1/0297 700/245 |

(Continued)

FOREIGN PATENT DOCUMENTS

| JP | 2006031570 A | * | 2/2006 |
| KR | 20160021161 A | * | 2/2016 |

OTHER PUBLICATIONS

Barca, J.C. et al., "Swarm robotics reviewed," Robotics, vol. 31, No. 3, pp. 345-359, 2013.

(Continued)

*Primary Examiner* — Khoi H Tran
*Assistant Examiner* — Nhi Q Bui
(74) *Attorney, Agent, or Firm* — Hunton Andrews Kurth LLP

(57) ABSTRACT

An exemplary multi-robot system can include, for example, a first robot(s), which can include a communication arrangement and a sensor arrangement configured to detect a presence of an object(s) within a predetermined distance from the first robot(s), and determine a distance from the first robot(s) to the object(s), where the first robot(s) can broadcast a query to the object(s) using the communication arrangement, identify the object(s) as a second robot(s) or a non-robot based on a response received from the object(s). The sensor arrangement can be a Light Detection and Ranging (LiDAR) sensor arrangement. The LiDAR sensor arrangement can be a two-dimensional LiDAR sensor arrangement.

26 Claims, 18 Drawing Sheets

(58) Field of Classification Search
CPC ............. H04L 9/50; H04L 9/3239; G05B 2219/39146

See application file for complete search history.

(56) References Cited

U.S. PATENT DOCUMENTS

| | | | | |
|---|---|---|---|---|
| 2007/0150106 | A1* | 6/2007 | Hashimoto | G06N 3/004 700/245 |
| 2011/0135189 | A1* | 6/2011 | Lee | G05D 1/0295 901/1 |
| 2012/0083982 | A1* | 4/2012 | Bonefas | G05D 1/0223 382/153 |
| 2012/0158176 | A1* | 6/2012 | Park | G05D 1/0274 901/1 |
| 2014/0203197 | A1* | 7/2014 | Jeon | G01S 17/74 250/557 |
| 2017/0072565 | A1* | 3/2017 | Egerstedt | B25J 9/1682 |
| 2017/0286916 | A1* | 10/2017 | Skiba | B25J 9/1689 |
| 2018/0285052 | A1* | 10/2018 | Eade | B65G 1/0492 |
| 2019/0072984 | A1* | 3/2019 | Dougherty | B64C 39/024 |

OTHER PUBLICATIONS

Beni, G. et al., "Theoretical problems for the realization of distributed robotic systems," Proc. IEEE Conf. Robotics and Automation (ICRA), vol. 3, pp. 1914-1920, 1991.
Bogue, R. "Growth in e-commerce boosts innovation in the warehouse robot market," Industrial Robot: An Int. Journal, vol. 43, No. 6, pp. 583-587, 2016.
M. Brambilla et al., "Swarm robotics: A review from the swarm engineering perspective," Swarm Intelligence, vol. 7, No. 1, pp. 1-41, 2013.
Chen, J.Y.C. et al., "Human-agent teaming for multirobot control: A review of human factors issues," IEEE Tran. on Human-Machine Systems, vol. 44, No. 1, pp. 13-29, 2014.
Couceiro et al., "A low-cost educational platform for swarm robotics," Int. J of Robots, Education and Art, vol. 2, No. 1, pp. 1-15, 2012.
Couceiro et al., "Benchmark of swarm robotics distributed techniques in a search task," Robotics and Autonomous Systems, vol. 62, No. 2, 200-213, 2014.
De Gennaro, M.C. et al. "Formation control for a cooperative multi-agent system using decentralized navigation functions," Proc. IEEE American Control Conf, pp. 1346-1351, 2006.
Feddema, J.T. et al., "Decentralized control of cooperative robotic vehicles: Theory and application," IEEE Tran. on Robotics and Automation, vol. 18, No. 5, pp. 852-864, 2002.
Avinash, G. et al., "A review of research in multi-robot systems," Proc. IEEE 7th Int. Conf on Industrial and Information Systems (ICHS), pp. 1-5, 2012.
Konstantinova, P. et al., "A study of a target tracking algorithm using global nearest neighbor approach," Proc. Int. Conf on Computer Systems and Technologies, pp. 290-295, 2003.
Kruger, J. et al., "Cooperation of human and machines in assembly lines," CIRP Annals-Manufacturing Technology, vol. 58, No. 2, pp. 628-646, 2009.
Murphy, R.R. "Rescue robotics for homeland security," Communications of the ACM, vol. 47, No. 3, pp. 66-68, 2004.
Naghsh, A.M. et al., "Analysis and design of human-robot swarm interaction in firefighting," Proc. IEEE Int. Symp. Robot and Human Interactive Communication (RO-MAN), pp. 255-260, 2008.
Sahin, E "Swarm robotics: From sources of inspiration to domains of application," Int. Workshop on Swarm Robotics, Lecture Notes in Computer Science, vol. 3342, Eds., Berlin, Germany: Spriger-Verlag, pp. 10-20, 2004.
Sandell, N. et al., "Survey of decentralized control methods for large scale systems," IEEE Tran. on Automatic Control, vol. 23, No. 2, pp. 108-128, 1978.
Sayama, H. "Decentralized control and interactive design methods for large-scale heterogeneous self-organizing swarms," Advances in Artificial Life, Lecture Notes in Computer Science, vol. 4648, Eds., Berlin, Germany: Springer-Verlag, pp. 675-684, 2007.
Tan Y. et al., "Research advance in swarm robotics," Defence Technology, vol. 9, No. 1, pp. 18-39, 2013.
Team in Flight, INTEL drones at the Olympic games, [From the internet] https://www.intel.com/content/www/us/en/sports/olympic-games/drones.html.
C.Y. Wong et al., "A hierarchically structured collective of coordinating mobile robots supervised by a single human," Software Design and Development: Concepts, Methodologies, Tools, and Applications. Hershey, PA: IGI Global, pp. 1142-1164, 2014.
Guizzo, E "Three engineers, hundreds of robots, one warehouse," IEEE Spectrum, vol. 45, No. 7, pp. 26-34, 2008.
Faiña, A. et al., "Towards an evolutionary design of modular robots for industry," Foundations on Natural and Artificial Computation, Lecture Notes in Computer Science, vol. 6686, Eds., Berlin, Germany: Springer-Verlag, pp. 50-59, 2011.
Pyo, Y.S. et al., ROS Robot Programming, Seoul, Republic of Korea: Robotis Co., Ltd., pp. 1-487, 2017.
Kolling, A et al. "Human interaction with robot swarms: A survey," IEEE Tran. on Human-Machine Systems, vol. 46, No. 1, pp. 9-26, 2016.
Kolling, A. et al., "Towards human control of robot swarms," Proc. ACM/IEEE int. Conf. on Human-Robot interaction (HRI), pp. 89-96, 2012.
Khoshnevis, B. et al., "Centralized sensing and control of multiple mobile robots," Computers and Industrial Engineering, vol. 35, No. 3-4, pp. 503-506, 1998.

* cited by examiner

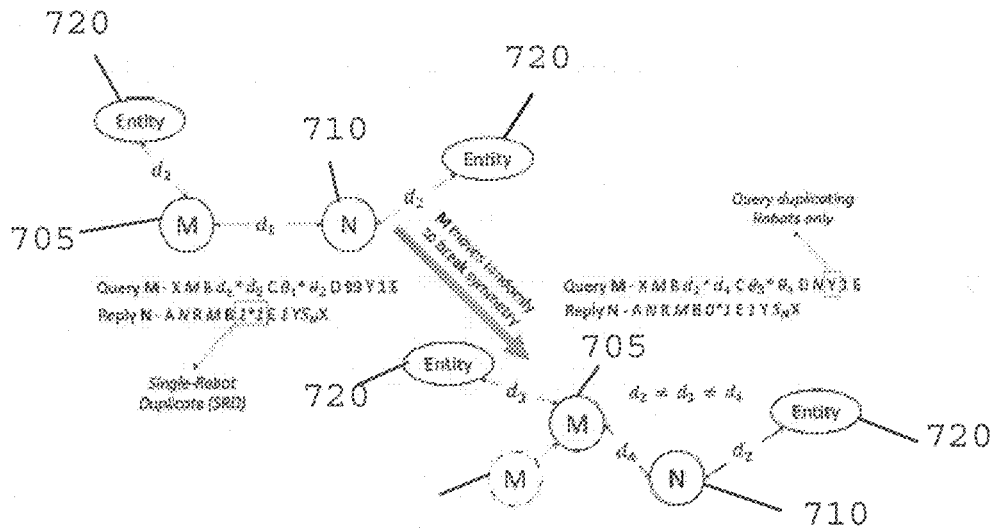
Figure 7A — Single-Robot Duplicate (SRD)
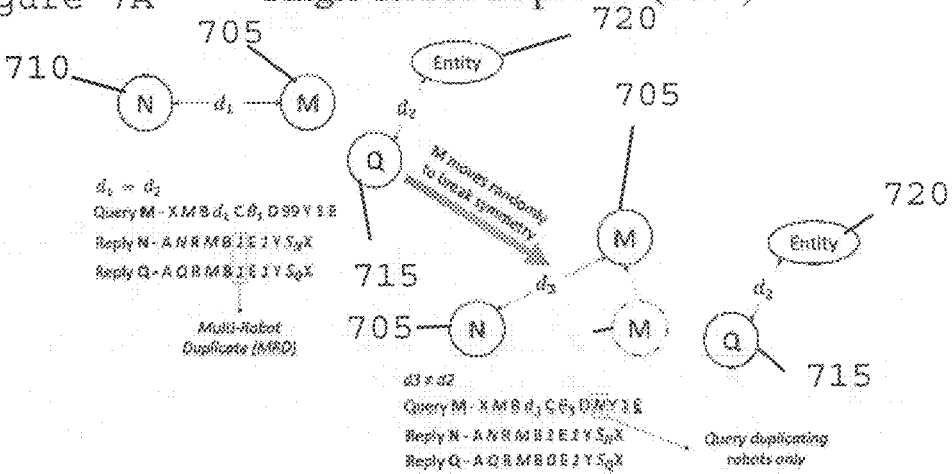
Figure 7B — Multi-Robot Duplicate (MRD)
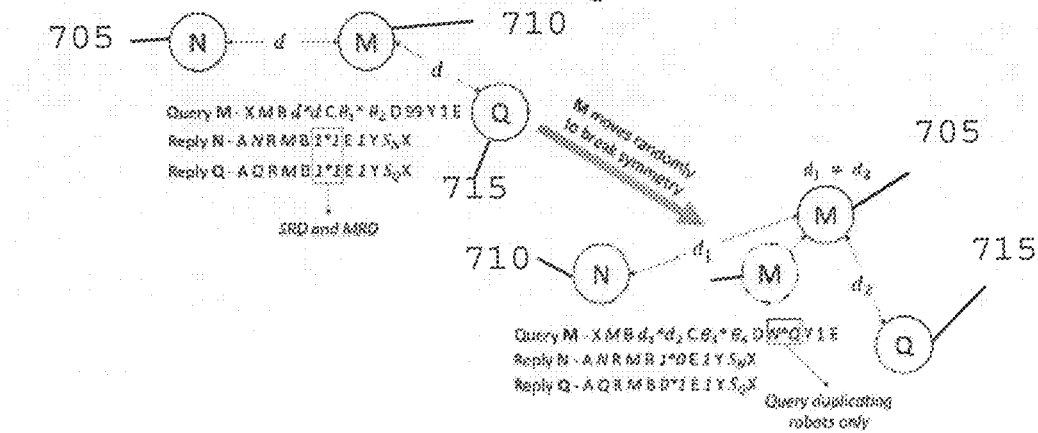
Figure 7C — SRD and MRD

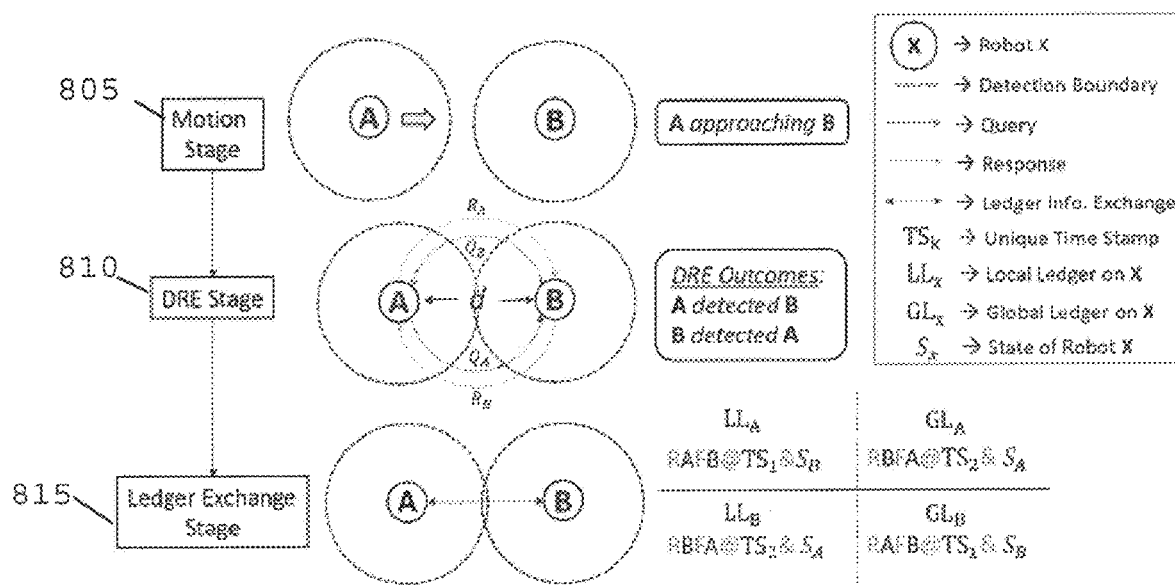
Figure 8A  Robot introduction
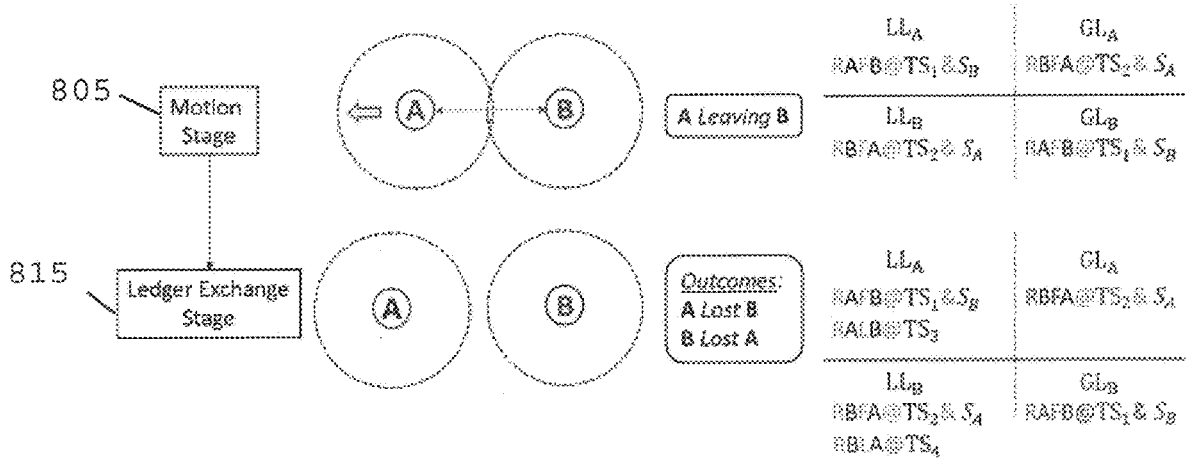
Figure 8B  Robot separation

A approaching B

| $LL_A$ | $GL_A$ |
|---|---|
| Empty | Empty |
| $LL_B$ | $GL_B$ |
| $RBFC@TS_1\&S_C$ | $RCFB@TS_2\&S_B$ |
| | $RCFD@TS_3\&S_D$ |
| | $RDFC@TS_4\&S_C$ |
| $LL_C$ | $GL_C$ |
| $RCFD@TS_3\&S_D$ | $RBFC@TS_1\&S_C$ |
| $RCFB@TS_2\&S_B$ | $RDFC@TS_4\&S_C$ |
| $LL_D$ | $GL_D$ |
| $RDFC@TS_4\&S_C$ | $RCFB@TS_2\&S_B$ |
| | $RCFD@TS_3\&S_D$ |
| | $RBFC@TS_1\&S_C$ |

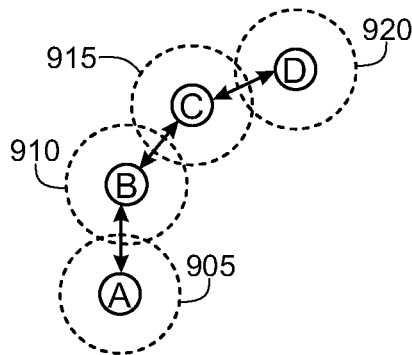

A merges with MRS BCD

| LL$_A$<br>RAFB@TS$_6$&S$_B$ | GL$_A$<br>RCFB@TS$_2$&S$_B$<br>RCFD@TS$_3$&S$_D$<br>RBFC@TS$_1$&S$_C$<br>RBFA@TS$_5$&S$_A$<br>RDFC@TS$_4$&S$_C$ |
|---|---|
| LL$_B$<br>RBFC@TS$_1$&S$_C$<br>RBFA@TS$_5$&S$_A$ | GL$_B$<br>RCFB@TS$_2$&S$_B$<br>RCFD@TS$_3$&S$_D$<br>RDFC@TS$_4$&S$_C$<br>RAFB@TS$_6$&S$_B$ |
| LL$_C$<br>RCFD@TS$_3$&S$_D$<br>RCFB@TS$_2$&S$_B$ | GL$_C$<br>RBFC@TS$_1$&S$_C$<br>RDFC@TS$_4$&S$_C$<br>RBFA@TS$_5$&S$_A$<br>RAFB@TS$_6$&S$_B$ |
| LL$_D$<br>RDFC@TS$_4$&S$_C$ | GL$_D$<br>RCFB@TS$_2$&S$_B$<br>RCFD@TS$_3$&S$_D$<br>RBFC@TS$_1$&S$_C$<br>RBFA@TS$_5$&S$_A$<br>RAFB@TS$_6$&S$_B$ |

Figure 9B

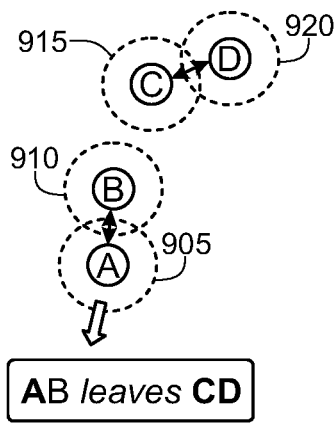

AB leaves CD

| LL$_A$ | GL$_A$ |
|---|---|
| RAFB@TS$_6$&S$_B$ | RCFB@TS$_2$&S$_B$ |
|  | RCFD@TS$_3$&S$_D$ |
|  | RBFC@TS$_1$&S$_C$ |
|  | RBFA@TS$_5$&S$_A$ |
|  | RDFC@TS$_4$&S$_C$ |
|  | RBLC@TS$_7$ |
| LL$_B$ | GL$_B$ |
| RBFC@TS$_1$&S$_C$ | RCFB@TS$_2$&S$_B$ |
| RBFA@TS$_5$&S$_A$ | RCFD@TS$_3$&S$_D$ |
| RBLC@TS$_7$ | RDFC@TS$_4$&S$_C$ |
|  | RAFB@TS$_6$&S$_B$ |
| LL$_C$ | GL$_C$ |
| RCFD@TS$_3$&S$_D$ | RBFC@TS$_1$&S$_C$ |
| RCFB@TS$_2$&S$_B$ | RDFC@TS$_4$&S$_C$ |
| RCLB@TS$_8$ | RBFA@TS$_5$&S$_A$ |
|  | RAFB@TS$_6$&S$_B$ |
| LL$_D$ | GL$_D$ |
| RDFC@TS$_4$&S$_C$ | RCFB@TS$_2$&S$_B$ |
|  | RCFD@TS$_3$&S$_D$ |
|  | RBFC@TS$_1$&S$_C$ |
|  | RBFA@TS$_5$&S$_A$ |
|  | RAFB@TS$_6$&S$_B$ |
|  | RCLB@TS$_8$ |

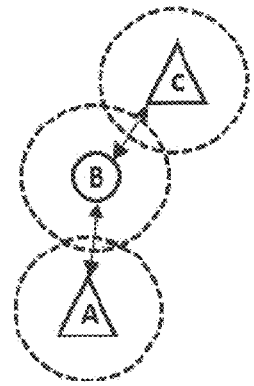

Initial MRS

| | LL$_A$ | GL$_A$ |
|---|---|---|
| | RAFB@TS$_4$ & 0 | RCFB@TS$_2$ & 0 |
| | | RBFC@TS$_1$ & 1 |
| | | RBFA@TS$_3$ & 1 |
| | LL$_B$ | GL$_B$ |
| | RBFC@TS$_1$ & 1 | RCFB@TS$_2$ & 0 |
| | RBFA@TS$_3$ & 1 | RAFB@TS$_4$ & 0 |
| | LL$_C$ | GL$_C$ |
| | RCFB@TS$_2$ & 0 | RBFC@TS$_1$ & 1 |
| | | RBFA@TS$_3$ & 1 |
| | | RAFB@TS$_4$ & 0 |

Figure 10B

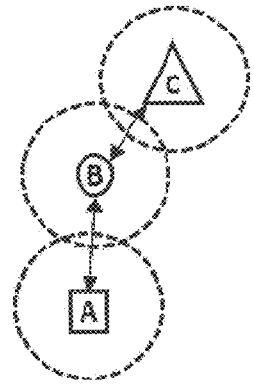

A changes to state-2

| | LL$_A$ | GL$_A$ |
|---|---|---|
| | RAFB@TS$_4$ & 0 | RCFB@TS$_2$ & 0 |
| | RAS2@TS$_5$ | RBFC@TS$_1$ & 0 |
| | | RBFA@TS$_3$ & 0 |
| | LL$_B$ | GL$_B$ |
| | RBFC@TS$_1$ & 1 | RCFB@TS$_2$ & 0 |
| | RBFA@TS$_3$ & 1 | RAFB@TS$_4$ & 0 |
| | | RAS2@TS$_5$ |
| | LL$_C$ | GL$_C$ |
| | RCFB@TS$_2$ & 0 | RBFC@TS$_1$ & 1 |
| | | RBFA@TS$_3$ & 1 |
| | | RAFB@TS$_4$ & 0 |
| | | RAS2@TS$_5$ |

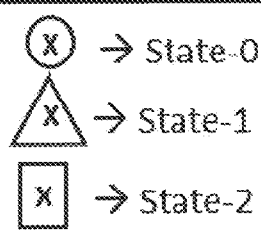

○ with X → State-0
△ with X → State-1
□ with X → State-2

Figure 11A
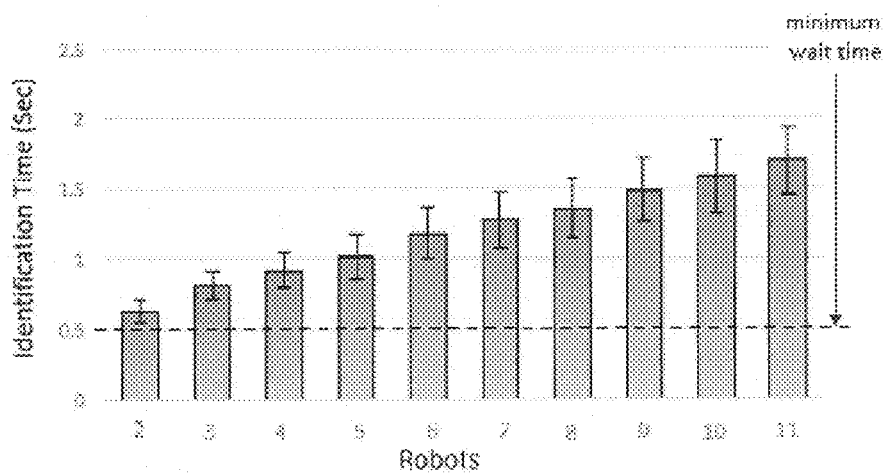
Identification time for robots at unique CDs
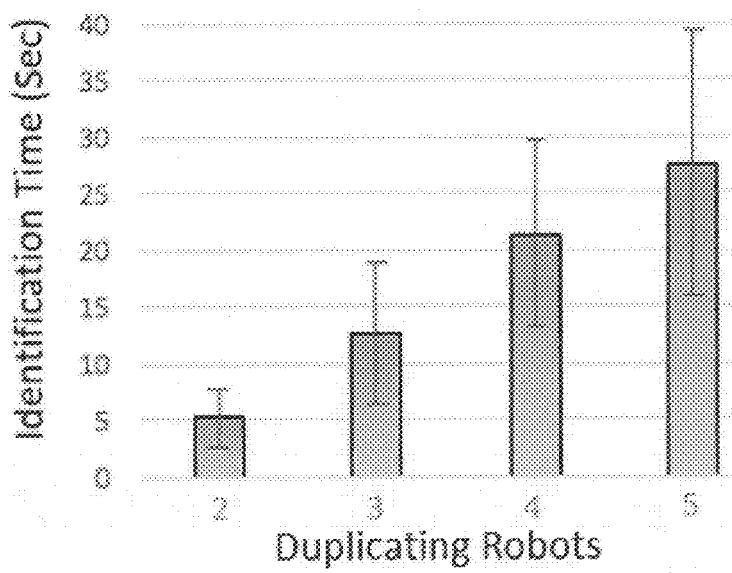
MRD/SRD correction time
Figure 11B

SYSTEM METHOD AND COMPUTER-ACCESSIBLE MEDIUM FOR BLOCKCHAIN-BASED DISTRIBUTED LEDGER FOR ANALYZING AND TRACKING ENVIRONMENTAL TARGETS

CROSS-REFERENCE TO RELATED APPLICATION(S)

This application relates to and claims priority from U.S. Patent Application No. 62/665,257, filed on May 1, 2018, the entire disclosure of which is incorporated herein by reference.

STATEMENT REGARDING FEDERALLY SPONSORED RESEARCH

This invention was made with government support under grant numbers EEC-1542286, ITEST grant DRL-1614085, and DRK-12 grant DRL-1417769, awarded by the National Science Foundation. The government has certain rights in the invention.

FIELD OF THE DISCLOSURE

The present disclosure relates generally to a blockchain-based distributed ledger, and more specifically, to exemplary embodiments of an exemplary system method and computer-accessible medium for blockchain-based distributed ledger for analyzing and tracking environmental-targets, e.g., in decentralized robot swarms.

BACKGROUND INFORMATION

Multiple Robot System ("MRSs") and swarm robotics research has attracted significant attention in the past decade (see, e.g., References 1 and 2) opening diverse application avenues. (See, e.g., References 3 and 4). For example, MRSs have been developed and implemented in industry, warehouse, security, education, and entertainment sectors. (See, e.g., References 5-13). Human-MRS interaction is important for such systems to establish and provide a global objective, identify faults, and monitor progress. (See, e.g., References 14-16). Many of these systems are centralized in nature because of the simplicity of centralization. In a centralized multi-robot system ("CMRS"), to accomplish a goal, the central-node provides instructions to the agents without having to reveal the global objective to each agent. This mode of operation of the CMRS permits complete supervision and control of individual agents, and facilitates each agent to be aware of the overall system state by querying the central-node. However, a communication disruption between the central-node and agents can lead to the failure of the entire system. (See, e.g., Reference 17). The CMRS also suffers from a physical limit on the number of agents connected to the central node. That is, for a reliable operation, the CMRS restricts secure connection to a limited number of agents. Moreover, in the CMRS, agents commonly rely on supervision and sensor feedback provided by an external sensor node, which is common to all agents. While such sensing methodology reduces the cost of overall system, it often restricts the workspace of the agents, and increases the burden on the central node. (See, e.g., Reference 18). Despite its simplicity and transparency, the above-described limitations of the CMRS make it inefficient and undesirable for applications that utilize large number of agents scattered in a large region; for example, in space exploration, search and rescue missions, among others. A decentralized multi-robot system ("DMRS") is increasingly being explored to address the drawbacks of the CMRS, and constitutes a viable alternative for such scenarios. (See, e.g., References 19-21).

In DMRS, the agents rely on the on-board computational and sensing resources of the agent. Moreover, agents coordinate with neighbors on local tasks to collectively accomplish the global goal. (See, e.g., References 22 and 23). Since DMRS does not utilize a central-node, it is robust to a single-point failure and can be scaled to large number of agents. Additionally, DMRS is robust in adapting to changes in the MRS's scale. However, unlike centralized systems, decentralized systems do not permit complete real-time supervision of agents from a central-node, nor do they facilitate any agent to gain awareness of the states of other agents in the MRS. Although the failure of a subgroup of agents in DMRS does not affect the performance of other agents in the same system, it can result in a global task remaining incomplete even if multiple local tasks are completed. Such behavior is undesirable in an ideal MRS since the system's overall progress needs to be tracked and agents need to be reassigned to service any incomplete tasks. Moreover, since an agent in DMRS relies on its on-board controller and sensors, it becomes incrementally expensive to accommodate high resolution imaging and ranging systems for accurate analysis of surroundings with a large number of neighboring agents. (See, e.g., Reference 24).

Thus, it may be beneficial to provide an exemplary system, method and computer-accessible medium for a blockchain-based distributed ledger so as to analyze and track environmental-targets in decentralized robot swarms which can overcome at least some of the deficiencies described herein above.

SUMMARY OF EXEMPLARY EMBODIMENTS

An exemplary multi-robot system can include, for example, a first robot(s), which can include a communication arrangement and a sensor arrangement configured to detect a presence of an object(s) within a predetermined distance from the first robot(s), and determine a distance from the first robot(s) to the object(s), where the first robot(s) can broadcast a query to the object(s) using the communication arrangement, identify the object(s) as a second robot(s) or a non-robot based on a response received from the object(s). The sensor arrangement can be a Light Detection and Ranging (LiDAR) sensor arrangement. The LiDAR sensor arrangement can be a two-dimensional LiDAR sensor arrangement.

In some exemplary embodiments of the present disclosure, the first robot(s) can be an autonomous robot. The distance can be a Euclidean distance. The first robot(s) can identify the object(s) as the second robot(s) if a response is received from the object(s). The response can include a first unique identification number for the second robot(s), a second unique identification number of the first robot(s), a response to the distance, a replying query number and a robot state. The robot state can include of idling, exploring, charging, servicing, foraging, low-battery, inactive, or excavating. The first robot(s) can identify the object(s) as the non-robot if no response is received from the object(s).

In certain exemplary embodiments of the present disclosure, the first robot(s) can include a unique identification number, and the query can include the unique identification number. The query can include (i) a unique identification number of the first robot(s), (ii) the distance, (iii) an angle, and (iv) a query number. The first robot(s) can be configured to store an identity of the second robot(s) if the response is received. The first robot can be configured to generate first map information, receive second map information from the second robot(s), and generate a combined map based on the first and second map information.

Additionally, an exemplary system, method and computer accessible medium for communicating within a multi-robot system, can include, for example, receiving first information related to a presence of an object(s) within a predetermined distance using a sensor arrangement, transmitting a query to the object using(s) a communication arrangement, and identifying the object(s) (i) as a robot(s) if a response is received from the object(s) or (ii) as a non-robot if no response is received from the object(s). The sensor arrangement can be a two-dimensional Light Detection and Ranging (LiDAR) sensor arrangement. The distance can be a Euclidean distance. The query can include a unique identification number of a robot configured to run the computer-accessible medium. The system can be a decentralized multi-robot system (DMRS). In some exemplary embodiments of the present disclosure, first map information can be generated, second map information can be received from the second robot(s), and a combined map can be generated based on the first and second map information.

An exemplary system for communicating within a multi-robot system, can include, for example, a sensor arrangement configured to detect a presence of an object(s) within a predetermined distance, a communication arrangement configured to transmit a query to the object(s), and a computer hardware arrangement configured to identify the object(s) (i) as a robot(s) if a response is received from the object(s) using the communication arrangement or (ii) as a non-robot if no response is received from the object(s).

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which:

FIGS. 3A-3C are exemplary diagrams illustrating possible dark-room exchange identification scenarios according to an exemplary embodiment of the present disclosure;

FIGS. 7A-7C are exemplary diagrams illustrating possible duplicative robot responses according to an exemplary embodiment of the present disclosure;

FIGS. 8A and 8B are exemplary diagrams illustrating possible robot pair distributed ledger updates according to an exemplary embodiment of the present disclosure;

FIG. 9B is an exemplary diagram illustrating possible post-merging distributed ledger updates according to an exemplary embodiment of the present disclosure;

FIG. 9C is an exemplary diagram illustrating distributed possible ledger updates after AB separates from CD according to an exemplary embodiment of the present disclosure;

FIGS. 10A and 10B are exemplary diagrams illustrating a possible distributed ledger update during a robot-state change according to an exemplary embodiment of the present disclosure;

FIG. 11A is an exemplary graph illustrating possible identification time for robots according to an exemplary embodiment of the present disclosure;

FIG. 11B is an exemplary graph illustrating possible multi-robot duplicate/single-robot duplicate correction time according to an exemplary embodiment of the present disclosure;

Figure 1A:
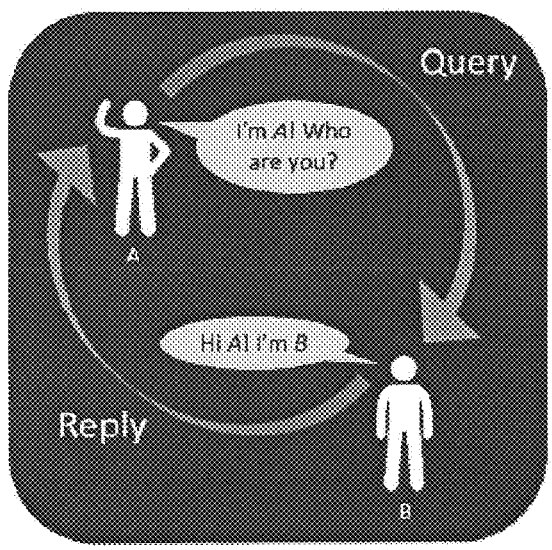
FIGS. 1A and 1B are exemplary diagrams of dark-room exchange procedures according to an exemplary embodiment of the present disclosure.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

The present disclosure relates generally to a blockchain-based distributed ledger, and more specifically, to exemplary embodiments of an exemplary system method and computer-accessible medium for blockchain-based distributed ledger for analyzing and tracking environmental-targets, e.g., in decentralized robot swarms. The exemplary system, method and computer-accessible medium, according to an exemplary embodiment of the present disclosure, can also be used for autonomous surveillance as well.

Figure 1B:
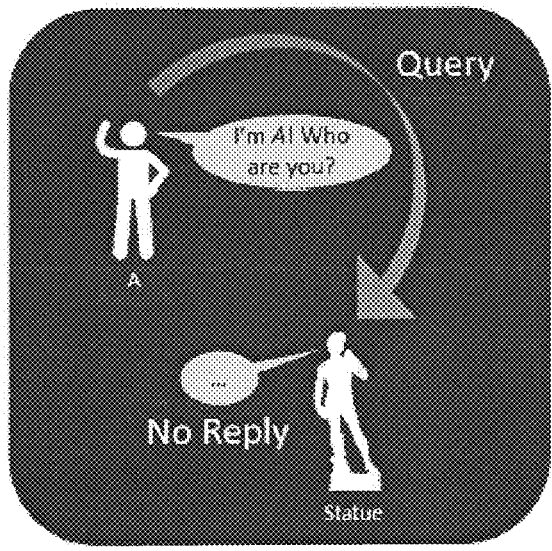

A dark-room exchange ("DRE") can be based on the visualization of two individuals (e.g., A and B) and a life-sized statue in a dark room. As shown in the diagrams of FIGS. 1A and 1B, this exemplary scenario can assume that the individuals in the room have limited perception and can only sense the presence of another person or a non-living object, such as the statue, in the room.

i) As shown in the diagram of FIG. 1A, A walks into an empty room where B is alone. A perceives the presence of an entity in the room but is unable to identify it. A queries, "I'm A! Who are you?". After a short interval B replies, "Hi A! I'm B".

ii) As shown in diagram of FIG. 1B, A walks into the room housing a statue. A perceives the presence of an entity in the room but is unable to identify it. A queries, "I'm A! Who are you?" After a moment of silence, A establishes that the perceived entity is a non-living object.

In the above two scenarios, A may only perceive the presence of an entity in the dark room. By posing a simple query, in the first scenario the receipt of a response facilitates A to establish the presence of B in the room, and in the second scenario the lack of a response facilitates A to establish the presence of a non-living object in the room.

Figure 2:
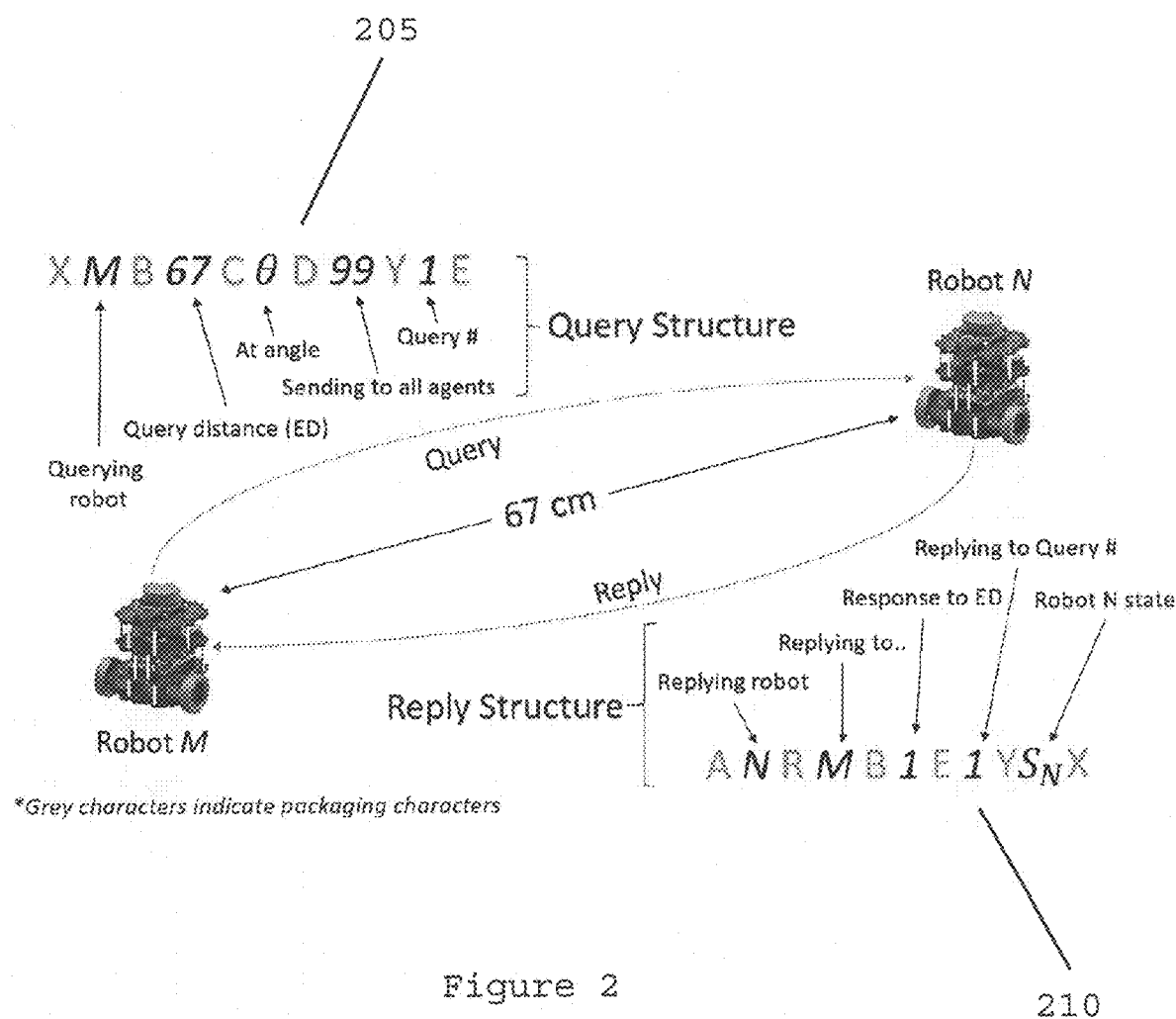
FIG. 2 is an exemplary diagram of a communication structure between robots according to an exemplary embodiment of the present disclosure.

In the exemplary DRE-DMRS, each robot can perceive unidentified entities in its neighborhood ("NBHD") by using only the two-dimensional ("2D") LiDAR range data in real-time. Having perceived entities in its NBHD, a robot can utilize the Euclidean distance ("ED") to the unknown objects for probing and verifying their identities. Using a query-reply conversation model, the robots can hold conversations to verify each other's identities as well as non-robot obstacles. Each robot can be assigned a unique ID, which the robots can add to queries and responses. Both query and response messages can use packaging characters to construct a single string message containing the utilized information. FIG. 2 shows the query structure 205 and the reply structure 210 used for robot-robot communication in the exemplary DRE.

As shown in the exemplary diagram of FIG. 2, the query structure can include the unique identification number of the querying robot, a querying distance (e.g., Euclidean distance), and angle, to how many other agents the query is sent to, and the query number, although not limited thereto. In addition to the reply robot N and query robot M identity, a binary response, and a query number, the reply message can also contain the current state of the replying robot. A robot state can be indicated by an integer, referred to as state identifier, and can be used to define any specific conditions or activities of the replying robot. For example, state identifiers 0-7 can indicate idling, exploring, charging, servicing, foraging, low-battery, inactive, and excavating. Additional state identifiers can be introduced, and existing ones can be modified as needed. A robot's neighborhood can be finite. Thus, N robots with intersecting neighborhoods can utilize $N^2$ messages to identify one another.

Exemplary Neighbor Identification Scenarios

The following exemplary identification scenarios can be used for an exemplary procedure to identify neighbors in DRE-DMRS robots. All agents in the swarm can broadcast queries and respond to received queries.

Exemplary Identifying a Stranger

When a robot comes in the vicinity of an unknown object, it can broadcast a query with its own identity and its ED from the unknown object, and wait for any replies. If the unknown object can be another robot, it can receive the query, establish that the querying robot can be at the same ED, and thus respond positively to the query along with its own identity. After receiving the response, the querying robot can assign the responding robot's identity to the unknown object. For example, the diagram shown in FIG. 3A illustrates robot M (e.g., 305) communicating with robot N (e.g., 310).

Figure 3C:
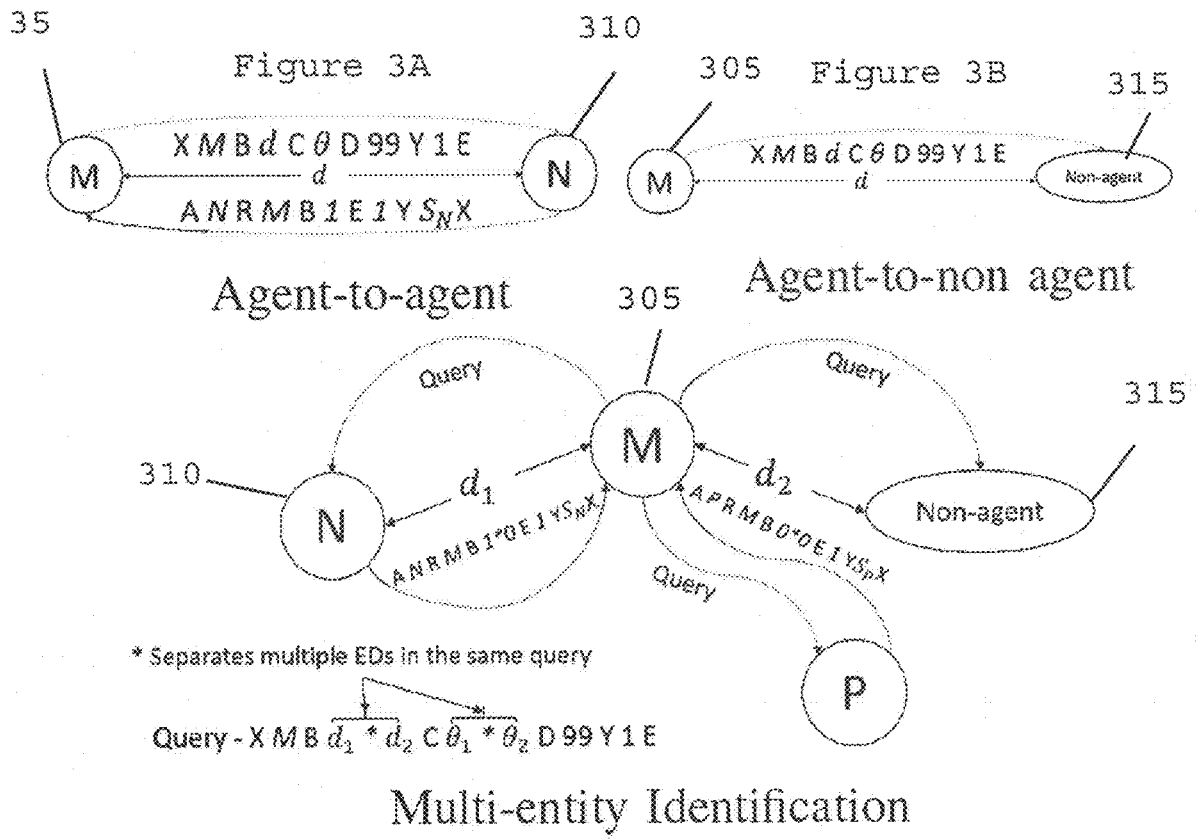

As shown in the exemplary diagram of FIG. 3B, when a robot broadcasts a query with its ED from an unknown object that happens to be a non-robot obstacle, the querying robot M (e.g., 305) does not receive any response and classifies that object as a non-robot obstacle 315. FIG. 3C shows an exemplary diagram of conversations in an environment with robot M (e.g., 305), robot N (e.g., 310), non-robot obstacle 315 and P. In this example, P may not be within the LiDAR detection range of M, but it can be within the reception range of M's query broadcast.

Exemplary Identifying Twins

A robot in the exemplary DRE-DMRS can send a query with multiple EDs if it encounters multiple unidentified objects as illustrated in FIG. 3C. Identities can be assigned to the unknown objects based on whether positive replies can be received with the corresponding EDs or not.

Figure 4A:
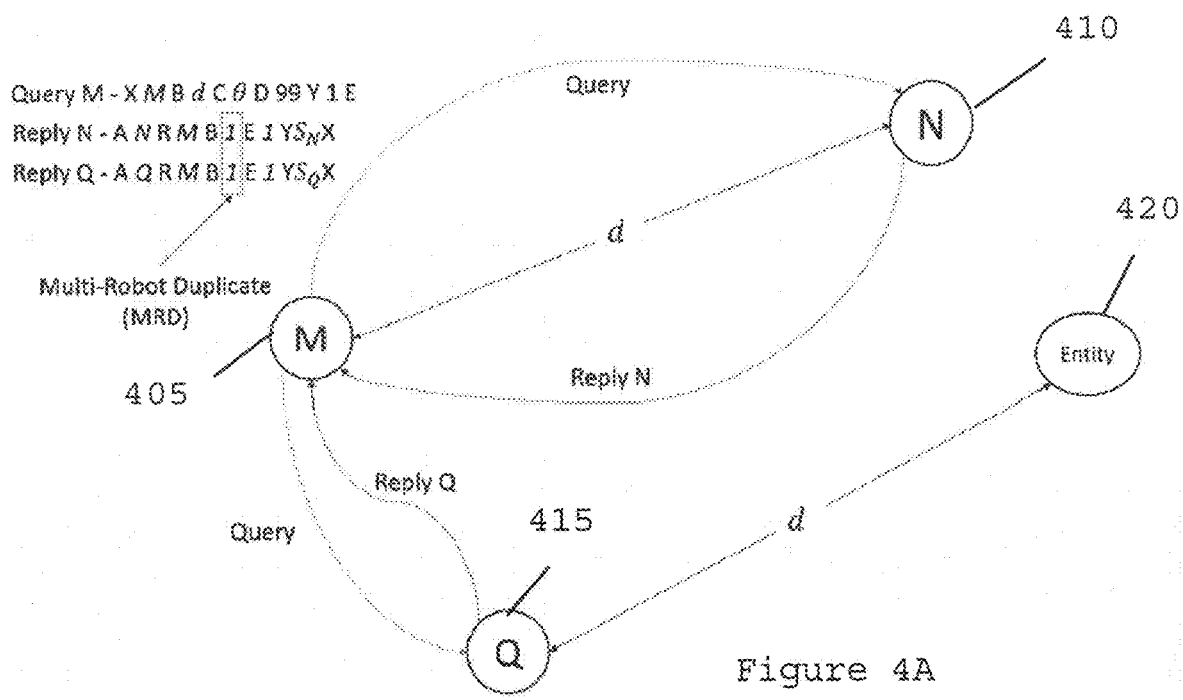
FIGS. 4A and 4B are exemplary diagrams illustrating possible duplications in responses to various queries according to an exemplary embodiment of the present disclosure.

A querying robot can encounter an entity at ED d that also happens to be the ED between another robot and some entity. For example, as shown in the diagram of FIG. 4A, the querying robot M (e.g., 405) encounters robot N (e.g., 410) at ED d and robot Q (e.g., 415) encounters another entity 420 at the same ED d. In this case, the querying robot M can receive positive responses from two robots (e.g., namely N and Q) for its ED d query. Next, to break the ED tie, the querying robot M (e.g., 405) performs a small random motion about its current position and re-broadcasts the query with updated ED only to the robots N (e.g., 410) and Q (e.g., 415) that responded positively to the earlier query. This scenario can be further extended to the case where more than two robots respond positively to a specific ED in the query. This scenario can be termed as multi-robot duplicate ("MRD").

Figure 4B:
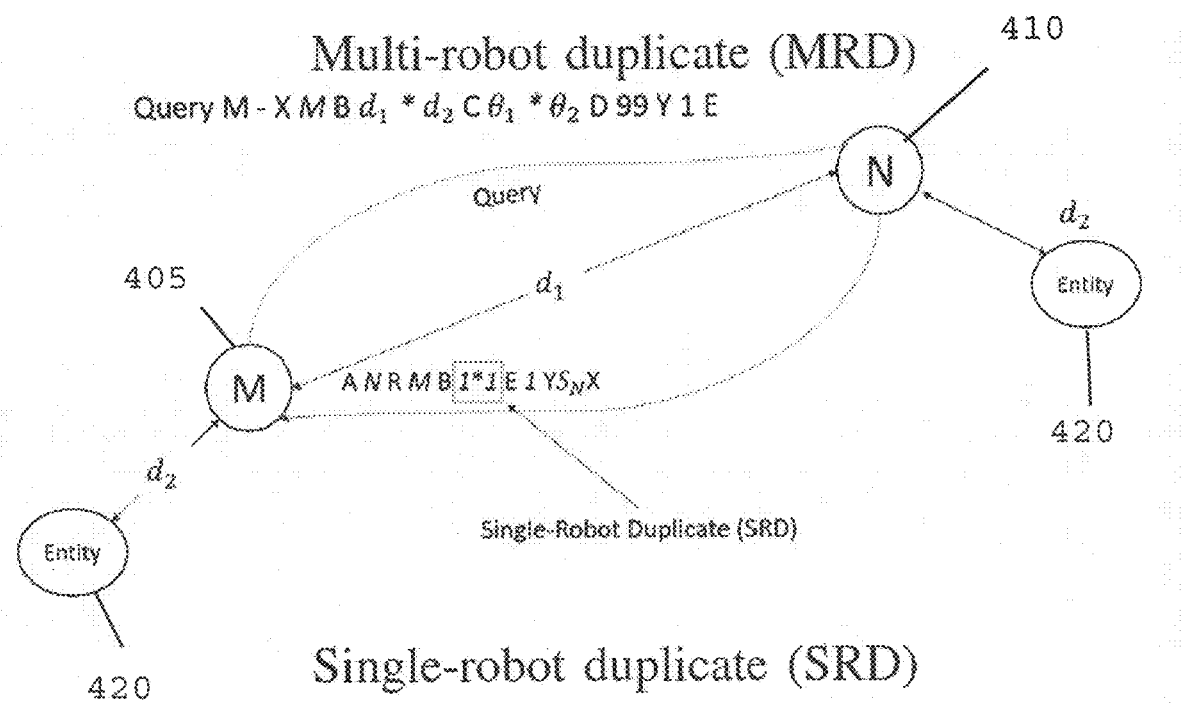

If the robot replies positively to multiple EDs from a same query, the querying robot discards both EDs and performs a small random motion before re-querying only the responding robot. This exemplary scenario can be called single-robot duplicate ("SRD"), and is shown in FIG. 4B, where robot N e.g., (410) can respond positively to the d1 and d2 ED queries of robot M (e.g., 405).

Additionally, the presence of multiple entities at similar EDs can result in conversations with SRDs and MRDs. The procedure to identify SRD and MRD scenarios in the exemplary DRE-DMRS is described below.

Exemplary TurtleBot3 Simulated Environment

Figure 5:
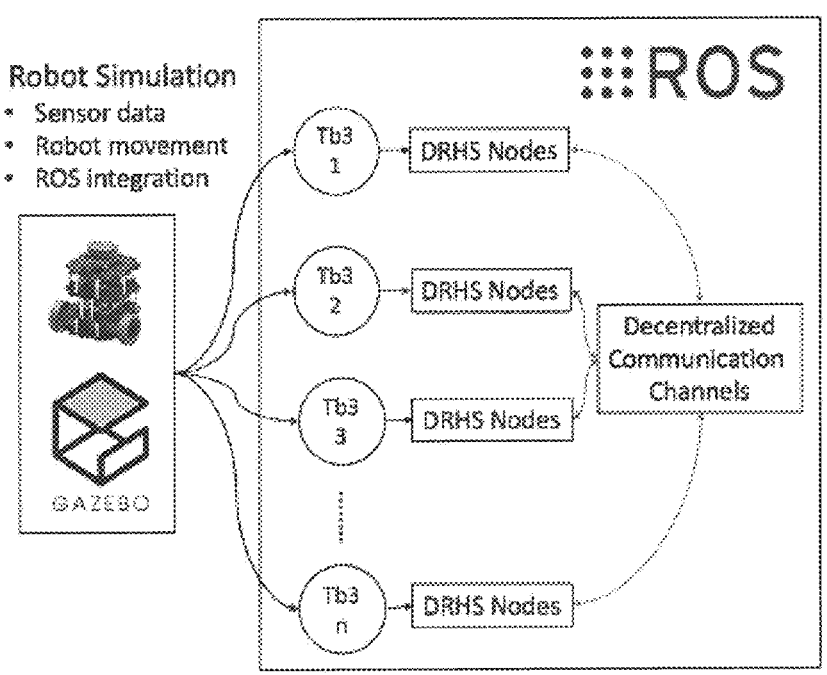
FIG. 5 is an exemplary diagram of a Gazebo-Robot Operating System map according to an exemplary embodiment of the present disclosure.

TurtleBot, based on the Robot Operating System ("ROS") (see, e.g., Reference 25) is an exemplary affordable mobile robot platform that is extensively used in robotics research and education. TurtleBot3, (see, e.g., Reference 25) the third generation of this platform, hosts an array of features such as a modular assembly, 360° LiDAR, Dynamixel smart actuators, Raspberry-Pi3 single-board computer ("SBC"), 9-axis IMU, etc. DRE-DMRS swarm system of the exemplary embodiments of the present disclosure solely utilizes the LiDAR for sensing. The simulated environment includes a network of TurtleBot3 robots operating in a decentralized manner. Gazebo robot simulation software (see, e.g., Reference 25) and the ROS environment can be used to perform real-time simulation of the TurtleBots. FIG. 5 shows an exemplary system map of Gazebo simulation and ROS. The software system on each simulated robot can include six subsystems, all connected through the ROS environment.

Figure 6:
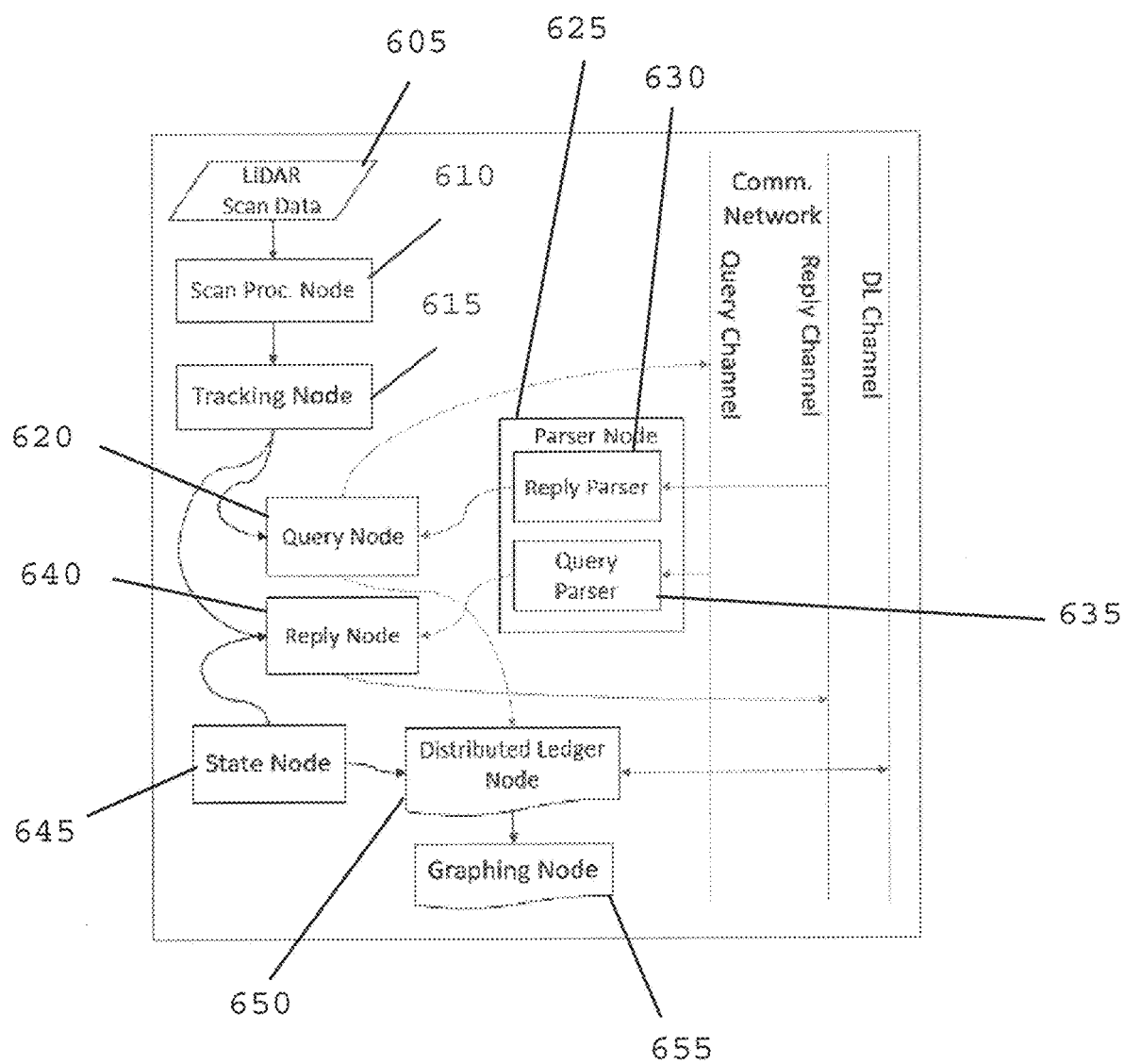
FIG. 6 is an exemplary diagram of dark-room exchange software nodes according to an exemplary embodiment of the present disclosure.

FIG. 6 shows an exemplary diagram of various software nodes working within each DRE-DMRS robot. For example, as shown in FIG. 6, LiDAR scan data 605 can be input in a scan processing node 610. A tracking node 615 can use the scan data and provide information to both a query node 620 and a reply node 640. A parser node 635 can include a replay parser 630 and a query parser 635. Reply parser 630 can utilize a query channel and query parser 635 can utilize a query channel. Query node 620 can communicate with query parser 635 using the query channel. Reply node 640 can communicate with reply parser 630 using the reply channel, and the reply from reply parser 625 can be provided to query node 620. Reply node 640 can also receive inputs from state node 645. An output from query node 620 can be provided to distributed ledger node 650, which can utilize a DL channel. Distributed ledger 650 node can also utilize state information from state node 645. Information from distributed ledger node 650 can be provided to graphing node 655.

Exemplary Scan Processing and Tracking Nodes

The scan processing node 610 executing on a robot can extract the 2D range data from the on-board LiDAR and process the data to identify objects of interest in the robot's NBHD. The LiDAR can have detection range of up to 300 cm and 1° resolution at 5 Hz. The laser range data acquired in the polar coordinate form $\{(r_i, \varphi_i), i=0, \ldots, 359°\}$ can be converted to the Cartesian coordinate form $\{(x, y)_i \triangleq (x_i, y_i) = (r_i \cos \varphi_i, r_i \sin \varphi_i)\}$. The range data can be segmented into clusters based on the ED between two consecutive points. Two points belong to the same cluster if, for example:

$$\|(x, y)i-(x, y)i-1\|<\sigma,$$

where $\|\cdot\|$ can denote that ED and $\sigma$ can be the maximum allowable distance between consecutive points belonging to the same cluster. $\sigma=5$ cm was deemed to yield acceptable clustering results for segmenting disjointed entities. Average cluster position $(X_i, Y_i)$ for each cluster with p points can be calculated as, for example:

$$(X_i Y_i) = \frac{1}{p_i} \sum_{j=1}^{p_i} (x_j, y_j).$$

The scan processing node 610 can package the average position, cluster size, and the cluster's distance from the robot for k detected clusters as $\{(Xi, Yi, pi, di), i=1, \ldots, k\}$, where $di=\|(Xi, Yi)\|$, and publishes to the "scan_proc" topic.

The tracking node 615 can subscribe to the scan_proc topic to track detected clusters in real-time. Each cluster can be assigned a unique tracking ID. The comparison between a set of clusters detected at time t, namely $k_t$ and the set of clusters detected previously at time t−1, namely $k_{t-1}$, can be viewed as a linear assignment problem. Using an exemplary Munkres procedure for minimal distance assignment, (see, e.g., Reference 26) the clusters in the newly detected cluster-set can be assigned corresponding tracking IDs from the previous cluster-set. Tracking node 615 can appends the unique tracking ID b to each detected cluster as $\{(X_i, Y_i, p_i, d_i, b_i), i=1, \ldots, k\}$ and publish the information to the "scan_trac" topic. Tracking can be limited to 100 cm due to the limited resolution offered by Turtlebot3 LiDAR and poor quality of detection of small objects, such as another Turtlebot3, at distances greater than 100 cm.

Exemplary Communication Network and Parsing Node

The exemplary communication network can be important in the functioning of a DMRS. In the exemplary DRE-DMRS simulation, communication channels can be modeled based on a 2-way radio. As illustrated in FIG. 6, the communication network can include three data pipes "q_channel", "r_channel", and "dl_channel" for transmitting queries, responses, and DL entries respectively. Every new robot that comes online can publish its queries to the q_channel and subscribe to the r_channel for responses. The data pipe can seamlessly support decentralized communication between a large number of robots. Additionally, the communication range for each robot can be limited to a radius of 150 cm, for example, a robot can receive a query/response from another robot only within the communication range. The role of the dl_channel is described below.

The parsing node 625 can be execute internally on each robot, and can be responsible for subscribing to the q_channel and r_channel pipes (through reply parser 630 and Query parser 635) for parsing and routing data to query and reply nodes, respectively. The Parser node 625 can decode the query and response messages by removing packaging characters and extracting relevant information. The parser node 625 can filter out the responses to the queries that were not sent by the robot running the parser node 625.

Exemplary Reply and State Nodes

The reply node 640 running on a robot can subscribe to the scan_trac topic and listen to incoming queries from other robots through the parser node 625. Once a query can be received, the reply node 640 can compare the query distance $d_q$ with distances $\{d_i, i=1, \ldots, k\}$ of k clusters detected and tracked by the scan procedure node 610 and the tracking node 615, respectively. The comparison can include the calculation of a confidence rating $c_i$ based on a Gaussian distribution with standard deviation $\sigma_r=3.16$ cm and scaling factor $\beta=2505$ as, for example, $$c_i = \frac{\beta}{\sqrt{2\pi}} e^{\frac{-(d_i-d_q)^2}{2\sigma_r^2}}.$$

Note that the above values of $\sigma_r$, and $\beta$ were determined experimentally. For $c_i>95\%$, the reply node responds "True" to the query, else a "False" can be broadcast through the r_channel. State node 645 can be an independent node which monitors the current state of the robot and publishes the state identifier to the "state_info" topic. Additionally, the reply node 640 can subscribe to the state_info topic and appends the current state identifier to the reply message.

Exemplary Query Node

The query node 620 on a robot can subscribe to the scan_trac topic and can be responsible for identifying the objects in its NBHD by initiating a conversation. Every new unidentified object that can be passed to the query node 620 by the tracking node 615 can be given an initial identity of 99. Following the initial ID assignment, the query node 620 can publish a query on the q_channel with the ED corresponding to the detected objects with ID 99. Post-query, the query node 620 can wait 0.5 seconds for any robots in the NBHD to respond to the query. After the wait time, the query node 620 can inspect incoming data to check for positive responses. If a positive response is received, the ID 99 of the unidentified object can be replaced by the ID of the positively responding robot. If none of the responses can be positive, the query node 620 can automatically classify the unidentified object by assigning it the ID 999, which can indicate that the unidentified object can be declared as a non-robot.

A query published by query node 620 can contain multiple EDs corresponding to multiple unidentified objects. This can usually arise during the start-up, or when a robot encounters a new group of robots or obstacles. Multiple robots can respond positively to a query distance leading to MRD or a single robot can respond positively to multiple EDs within the same query causing SRD. To overcome these situations, the following exemplary procedure can be implemented to analyze the incoming responses to detect the presence of MRD and/or SRD. For example, FIGS. 7A-7C are exemplary diagrams illustrating duplicative robot responses for robot M (e.g., 705), robot N, (e.g., 710), robot Q (e.g., 715), and one or more entities (e.g., 720) according to an exemplary embodiment of the present disclosure. For example, FIG. 7A illustrates a single-robot duplicate, FIG. 7B illustrates a multi-robot duplicate and FIG. 7C illustrates exemplary SRD and MRD scenarios.

For m unidentified objects in the querying robot's NBHD, an incoming response data set can be represented by $\{r_{i,u}, i=1, \ldots, p \text{ and } u=1, \ldots, m\}$ where $r_{i,u}$ can be the ith robot's Boolean response to the $u^{th}$ query distance $d_u$. For the querying robot, consider its response verification matrix R below, which can be a p×m matrix, where p can denote the number of responding robots, $$R \triangleq \begin{pmatrix} r_{1,1} & r_{1,2} & \cdots & r_{1,m} \\ r_{2,1} & r_{2,2} & \cdots & r_{2,m} \\ \vdots & \vdots & \vdots & \vdots \\ r_{p,1} & r_{p,2} & \cdots & r_{p,m} \end{pmatrix} \quad (1)$$

Next, a single-robot duplicate check vector S, given below, can inspect if a response includes multiple positives $$S = \{S_i\}, S_i = \begin{cases} 1, \text{ if } \sum_{j=1}^{m} r_{i,j} \leq 1 \\ 0, \text{ otherwise} \end{cases}, i = 1, \ldots, p. \quad (2)$$

Similarly, a multi-robot duplicate check vector M, given below, can inspect if multiple robots responded positively to a specific CD within the same query $$M = \{M_j\}, M_j = \begin{cases} 1, \text{ if } \sum_{i=1}^{p} r_{i,j} \leq 1 \\ 0, \text{ otherwise} \end{cases}, j = 1, \ldots, m. \quad (3)$$

TABLE I

DL entry inference

| DL Entry | Meaning |
|---|---|
| RAFB@TS$_1$&S$_B$ | A found B at time TS$_1$ in state S$_B$ |
| RALB@TS$_2$ | A lost B at time TS$_2$ |
| RAS2@TS$_3$ | A changed state to 2 at time TS$_3$ |

*Grey characters indicate packaging characters

Using Eqs. (2) and (3), an output vector Γ can be computed below, which can indicate the validity of each of the p responses. Thus, for example:

$$\Gamma = \{\Gamma_i\}, \Gamma_i = \sum_{j=1}^{m} r_{i,j} S_i M_j, i=1, \ldots, p. \quad (4)$$

The appearance of a zero at an index g in the Γ vector (e.g., $\Gamma_g=0$) can correspond to the presence of a MRD and/or a SRD in the response stored at $r_{g,:}$. Such exemplary responses can be discarded and the identity of the corresponding robot can be recorded into a vector A for re-verification. Clean responses that do not contain duplicates can be processed by assigning the responding robot's ID to the unidentified object detected at the positively identified query distance. After assignment of clean responses, if A contains robots for re-verification, the querying robot can rotate to a random angle between −180° to 180° and move linearly for 15 cm. Following a random movement, the robot can re-initiate the query process, now only requesting responses from robots whose IDs can be in the vector Λ. This process can be repeated until no duplicates can be present. The identity of detected robots in the neighborhood can be published by the query node to the "robot_detections" topic.

Exemplary Distributed Ledger Node

The DL node 650 can run as a parallel process on each robot, and can subscribe to the "robot_detections" topic published by the query node 620. On each robot, the DL node 650 can create and updates two ledgers, local ("LL") and global ("GL"), with the former containing the NBHD information of the local robot and the latter containing the NBHD information shared by other robots. Ledger entries can be populated with detection information, time stamp, and neighboring robot state. Similar to the DRE query-response structure, the DL entries can be encoded into a string using packaging characters as shown in Table I below.

FIG. 8A shows the DL exchange between a robot pair during initial contact for the motion stage 805, DRE stage 810 and the ledger exchange stage 815, and FIG. 8B shows the ledger update when the robot pair separates for the motion stage 805 and the ledger exchange stage 815, according to an exemplary embodiment of the present disclosure. $TS_k$ can indicate unique time stamps, and may not be chronologically organized in either DLs. The time stamp can be used later by the graphing node 655 to organize the ledger entries chronologically and construct the network graph in real-time. The LL entries can be updated by the query node 620 and the reply node 640, while the GL entries can be received through the dl_channel. After either ledger's update process, both ledgers can be shared with the robot's neighbors via the dl_channel. The LLs and GLs can be shared with the neighboring agents during each initial contact. Additionally, the ledgers can be subsequently shared when either ledger can be updated. The GL information received from a neighboring robot can be filtered to remove entries corresponding to the receiving robot since that information can already be contained in the LL of latter. Moreover, the filtered entries can be merged with the receiving robot's GL while ensuring that no duplicate entries can be present. While the LL-GL set can be unique for each robot, the union of the two ledgers on the respective robots can be identical, as shown in FIG. 8B.

Figure 9A:
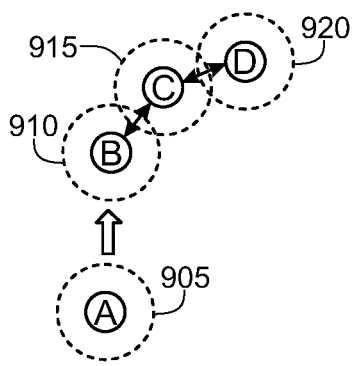
FIG. 9A is an exemplary diagram illustrating possible pre-merging distributed ledger updates according to an exemplary embodiment of the present disclosure.

The DL update process for merging and separating a robot with an MRS is shown in FIG. 9A. For example, FIG. 9A shows an exemplary diagram illustrating pre-merging distributed ledger updates as A (e.g., 905) approaches B (e.g., 910), which is already merged with C (e.g., 915) and D (e.g., 920). FIG. 9B shows an exemplary diagram illustrating post-merging distributed ledger updates as A (e.g., 905) merges with B (e.g., 910), which is already merged with C (e.g., 915) and D (e.g., 920). FIG. 9C shows an exemplary diagram illustrating distributed ledger updates after AB (e.g., 905 and 910) separates from CD (e.g., 915 and 920).

As shown in the diagram of FIG. 9A, robot A is approaching MRS BCD. The DLs on MRS agents can be up-to-date, reflecting the current neighborhood. When A enters B's range, the two robots initiate DRE, identifying each other and exchanging respective DLs. The LLs on either robots can reflect the change in its respective neighborhood. The LL information from A can be stored in B's GL and vice versa for A. Similarly, each robot can copy the entries from the received GL onto its GL, while removing entries pertaining to itself. After its ledgers update, B can share its DLs with its neighbor C. In this case, only GL on C updates since its local neighborhood can be unchanged. Similarly, after the ledger update, C can share its ledgers with D, updating its GL. Similarly, FIG. 9B demonstrates the DL update process during separation of MRS ABCD. For example, immediately after B departs from C's range, the robots update their respective local ledgers. However, B and C do not share DL information since they can be separated, as shown in FIG. 9C.

FIGS. 10A and 10B show exemplary diagrams illustrating a distributed ledger update during a robot-state change according to an exemplary embodiment of the present disclosure. For example, the exemplary diagram shown in FIG. 10A illustrates initial MRS for A at state 1, and the diagram shown in FIG. 10B shows a change in the state of A from state 1 to state 2.

The DL node further subscribes to the state_info topic to acquire the current state identifier of the robot. In addition to identifying a robot's state when it merges with the MRS, DLs can permit or facilitate the MRS to update the robot state information in real-time. As shown in FIGS. 10A and 10B, a change in state on a robot can be recorded in its LL. This updated ledger can be exchanged with the robot's neighbors. Through this procedure, every robot can update its state and can monitor the states of other robots in the decentralized system.

Exemplary Graphing Node

The graphing node 655 can run in series with the DL node 650 on each robot and can be responsible for generating the network graph of the DMRS. The graphing node 655 can merge the GL and LL entries and sort them in chronological order. The sorted list of entries can be used to generate a real-time network graph. The graph can be refreshed at every DL update instance. Although the graphing node 655 can iterate through the entire sorted ledger entries during every DL update instance, it can be a vital process to ensure that the neighborhood can be accurately updated. For example, if a new robot merged with the DMRS, it can contain ledger entries with time stamps that precede ledger entries of the DMRS. The graphing node 655 can therefore sort the merged ledger entries chronologically and process the entire ledger to generate the network graph. The graphing node 655 can provide an intuitive mechanism to impart a human operator full awareness of the MRS.

Exemplary Simulation Results

For an MRS include n robots, a single query by a robot can receive n−1 responses, thus n queries can receive n(n−1) responses, for example, as the number of robots in the MRS can increase the processing time can increase. FIG. 11A show an exemplary graph of the time utilized by a robot to identify neighboring robots separated from it at unique EDs. The identification time delay in the exemplary graph shown in FIG. 11A includes a 500 ms wait time during which the querying robot waits for incoming responses after broadcasting its query. Each additional robot can induce a 110 ms average increase in identification time with a 33 ms standard deviation. FIG. 11B shows an exemplary graph illustrating the average increase in identification time with duplicating robots. Specifically, the identification delay increases by an average of 7.45 s, with a 900 ms standard deviation, for each additional duplicating robot with the same ED. This increase in delay and standard deviation can be caused because the querying robot needs to perform a random motion to break similar ED ties and achieve unique EDs with all its responding neighbors. The average identification time for a non-robot can be 560 ms with a 35 ms standard deviation. It can be observed that the number of non-robots in the environment does not affect the identification time for non-robots. When a query corresponding to the ED to an entity can be broadcast, the querying robot automatically assigns the entity as a non-robot if no response can be received in 500 ms.

Regardless of the number of unidentified entities in the DSS, the querying robot can automatically identify any non-responding entity as a non-robot. Thus, the average identification time for a non-robot obstacle does not change with the number of non-robots. However, a querying robot's ED tie with a non-robot and a responding robot can cause the responding robot to reply with a SRD, triggering the querying robot to perform a random motion to break the ED symmetry. The delay associated with this scenario can be similar to MRD/SRD correction time shown in FIG. 11B. The presented data was gathered from 1000 successful trials for each MRS scenario. 100 trials each were performed to check the success rate of DRE identification in a robot's immediate neighborhood. As shown in Table II, the success rate drops significantly as the robot encounters more than 5 unique neighbors. This drop can be attributed to the resolution and the noise in produced LiDAR data. Further improvements to the scan procedure node 610 can improve the blob detection and tracking capabilities. However, the robot can be capable of maintaining more than 5 neighbors if it encounters 1 or 2 new neighbors each time the robot's local neighborhood expands. Additionally, the DL based network-graph relies on the accuracy of the local neighborhood detection of independent robots. Thus, its accuracy can be directly related to Table II.

TABLE II

| | New neighbor success | | | | | | |
|---|---|---|---|---|---|---|---|
| Neighbors | 1 | 2 | 3 | 4 | 5 | 6 | 7 |
| Success % | 100 | 98 | 98 | 97 | 91 | 83 | 81 |

Exemplary Mapping

According to an exemplary embodiment of the present disclosure, two or more independent robots can be tasked to explore and map separate sections of an unexplored area. Upon completing their assigned exploration task, each robot can converge at a common location (e.g., which can be predetermined ahead of time or which can be set ad hoc after completing the assigned exploration task). After identifying each other, the robots can then share their respective maps with peers. Further, each robot can merge the maps transmitted by peers with its own acquired map to produce a new map of the entire area (e.g., which can include a larger area than for each robot individually).

In order to generate a distributed map, the exemplary system, method and computer-accessible medium can share an occupancy grid map ("OGM") via a peer-to-peer ("P2P") network without loss by encrypting the OGM to a string message on the sender side and decrypting on the receiver side.

During the merging of a map from different robots, the exemplary system, method and computer-accessible medium can, e.g., crop a region of interest ("ROI") using a circular region around the current position of the robots. Each robot can then estimate several approximate poses (e.g., positions and orientations) of the sending robot and use these poses to perform an iterative closest point ("ICP") procedure to ensure the most optimal registration.

In order to generate a combined map, according to one example, the exemplary robots can utilize the exemplary DRE procedure, for example, as described herein, to identify each other during initial contact. Using the exemplary DRE, the robots can acquire the approximate pose of the sending robot relative to itself. This information can then be utilized to perform a map merging procedure, which can scatter multiple random poses (e.g., 10, 20, 30, 40, etc.) in close proximity (e.g., a 5 cm, a 10 cm, a 15 cm radius, etc.) to the initial estimate. The estimated points can then be used as initial points for the exemplary ICP procedure.

After merging the maps, the robots can store the received map locally in its distributed ledger. This information can be tagged with a timestamp and the identity and the approximate pose of the robot that provided it. This entry can facilitate another robot in the future to merge this information to its own map by calculating the relative pose with respect to itself.

Figure 12:
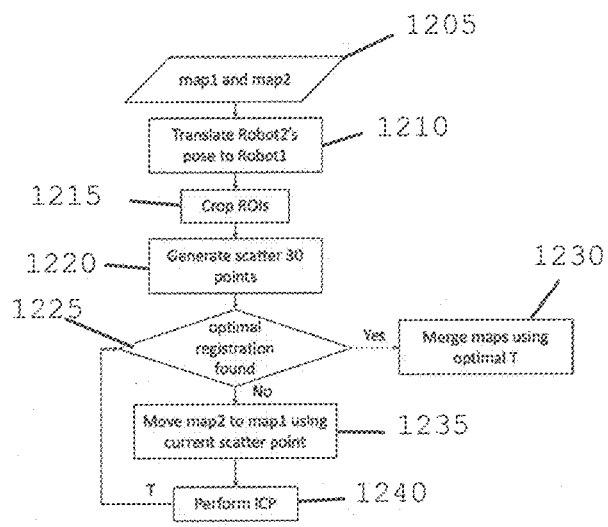
FIG. 12 is an exemplary flow diagram of a method for performing an iterative closest point procedure according to an exemplary embodiment of the present disclosure.

FIG. 12 shows an exemplary flow diagram of a method for performing an iterative closest point procedure according to an exemplary embodiment of the present disclosure. For example, at procedure 1205, two maps (e.g., map 1 and map 2) can be received. At procedure 1210, a pose from a robot (e.g., robot 2) can be translated to another robot (e.g., robot 1). At procedure 1215, ROIs in the maps can be cropped. At procedure 1220, multiple scatter points (e.g., 30 scatter points) can be generated. At procedure 1225, if an optimal registration in the maps can be determined, then the maps can be merged using this optimal area at procedure 1230. If no optimal registration is determined at procedure 1225, then at procedure 1235, map 2 can be moved relative to map 1 using at least one of the scatter points. At procedure 1240, an exemplary ICP procedure can be performed, and then a check can be performed again at procedure 1225 to determine if an optimal registration is present.

Figure 13:
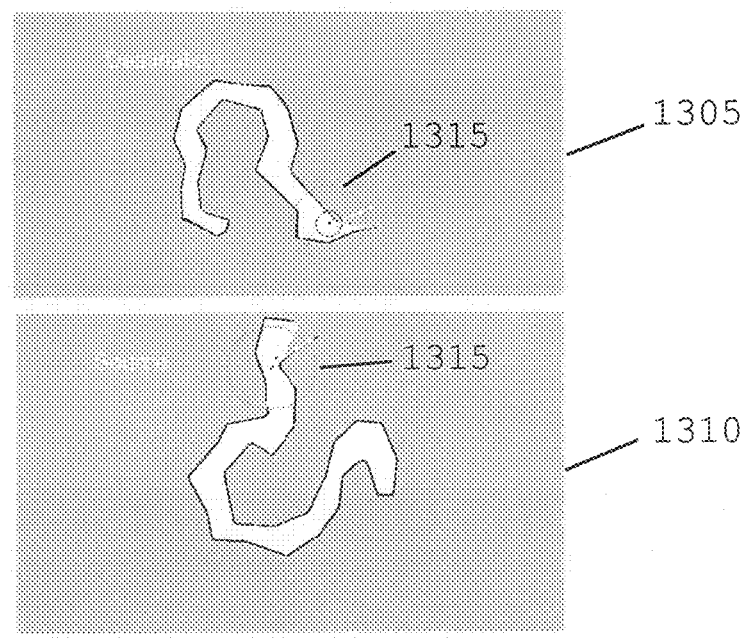
FIG. 13 are exemplary source and destination maps according to an exemplary embodiment of the present disclosure.

FIG. 13 shows an exemplary source map 1310 and destination map 1305 according to an exemplary embodiment of the present disclosure. These exemplary maps can be used as inputs to merge the maps into a single map. The exemplary region of interest (e.g., which can be used to crop the maps in procedure 1215 described above) is shown by element 1315.

Figure 14:
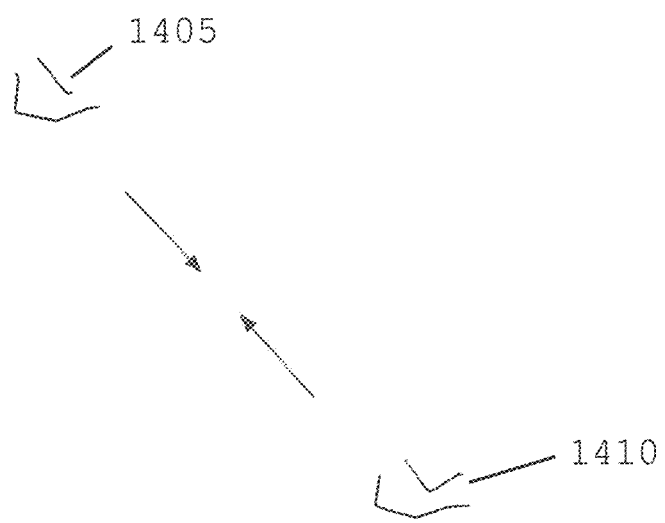
FIG. 14 is an exemplary diagram for checking and/or verifying registration using an iterative closest point procedure for two regions of interest according to an exemplary embodiment of the present disclosure.
Figure 15:
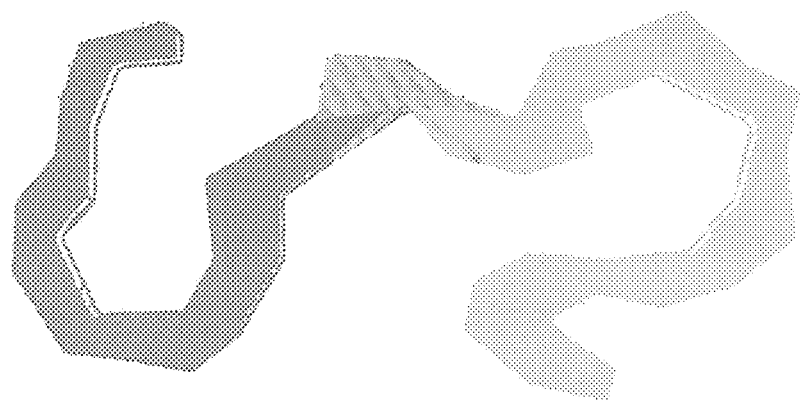
FIG. 15 is an exemplary merged map after map registration according to an exemplary embodiment of the present disclosure.

FIG. 14 shows an exemplary diagram for checking a registration using an exemplary ICP procedure (e.g., the ICP procedure described above in procedure 1240) for two regions of interest according to an exemplary embodiment of the present disclosure. As shown in FIG. 14, two areas 1405 and 1410, which can be identified as being close or similar to one another, can be identified, and the maps can converge on these identified areas. FIG. 15 shows an exemplary merged map after map registration according to an exemplary embodiment of the present disclosure.

Exemplary Conclusion

Figure 16:
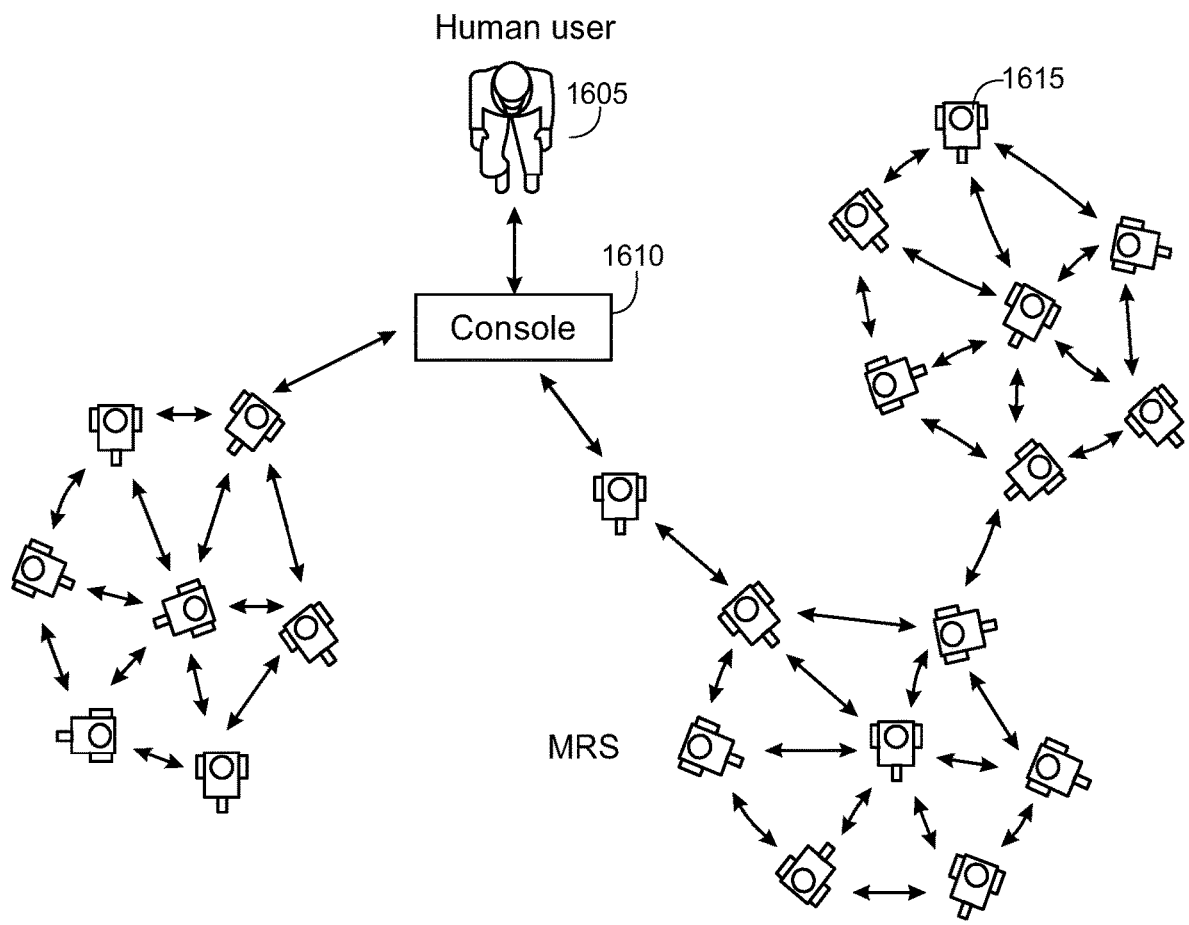
FIG. 16 is an exemplary diagram illustrating a Human-multi-robot system interface according to an exemplary embodiment of the present disclosure.

The exemplary DRE can be used to identify and localize neighbors in a decentralized multi-robot system. This can provide a human operator a novel and intuitive interface for monitoring the neighborhoods and states of the MRS agents. As shown in the diagram of FIG. 16, the human user 1605 can monitor the overall state of the MRS by synchronizing the DLs on a console 1610 by interacting with one or more robots 1615 as needed. Alternatively, long range transmission can be used to connect with one or more robots for extracting the DLs. Further, this work can be extended to facilitate human users to interact with states and objectives of individual or groups of robots in the MRS. Unlike conventional DMRS, neighbor identification with DRE-DMRS procedure can be achieved through a 2D LiDAR, which greatly reduces the cost of implementing decentralized behavior in large robotic systems. This exemplary protocol overcomes the drawbacks of centralized and decentralized MRS procedures by facilitating a scalable multi-robot communication method that facilitates each agent to be aware of its neighborhood, and that of other agents in the swarm, through a set of distributed ledgers.

In addition to storing the network graph information, the ledger can be used to identify and update the current state of all agents of the MRS in real-time. For example, agents in the MRS can be used to share intent and cast a vote for collective decision making. Moreover, objects in another object's shadow cannot be tracked or detected by the current tracking methodology. In some exemplary embodiments of the present disclosure, a Kalman filter based multi-target tracking can be included for improved object tracking. The exemplary system can be implemented for agent-to-agent cooperation by communicating state and intent messages in a swarm of self-driving vehicles via direct short-range communication ("DSRC"). Additionally, encrypted conversations between the robots can be utilized, creating a secure and immutable distributed ledger.

Figure 17:
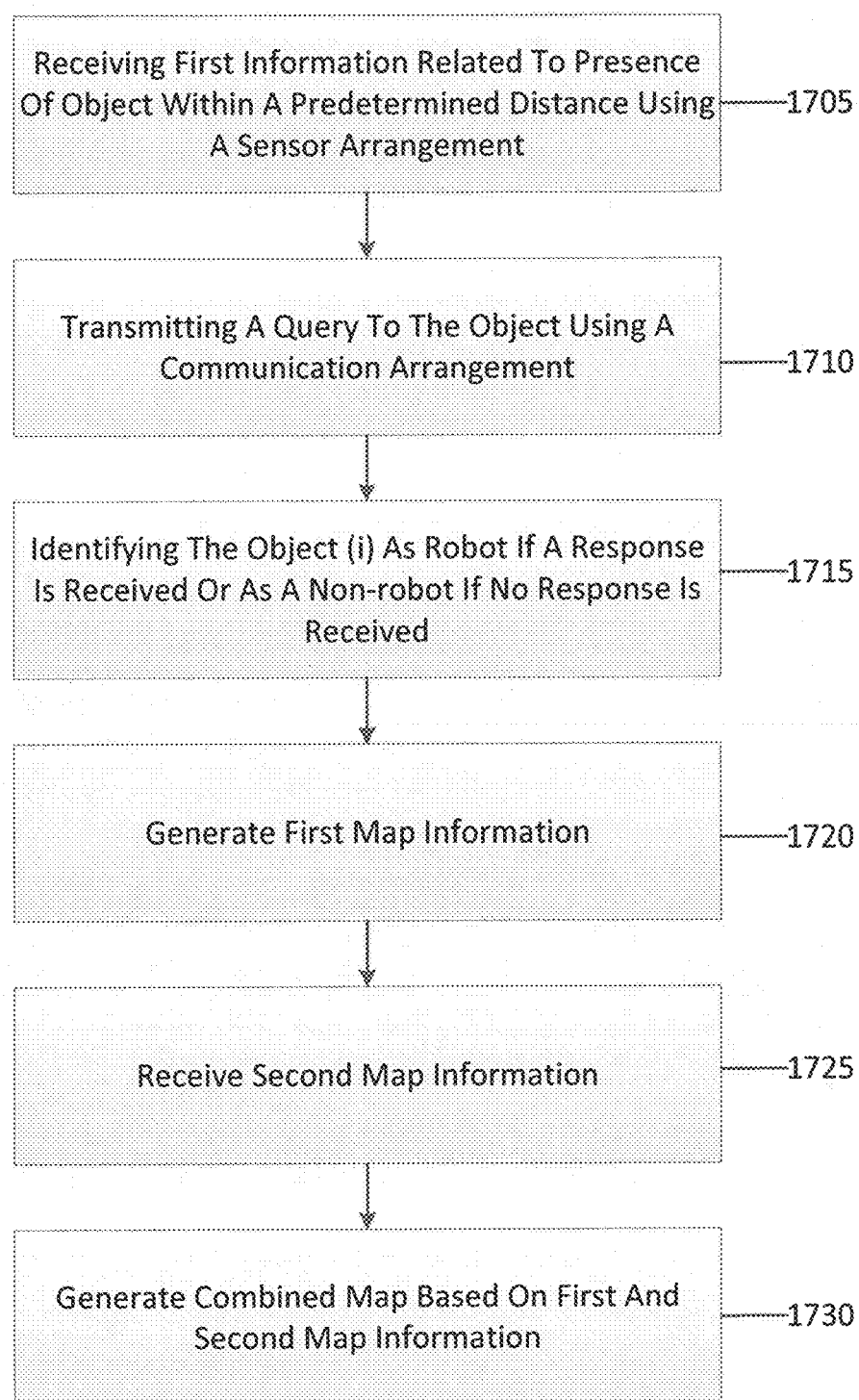
FIG. 17 is an exemplary flow diagram of a method for communicating within a multi-robot system according to an exemplary embodiment of the present disclosure.
Figure 18:
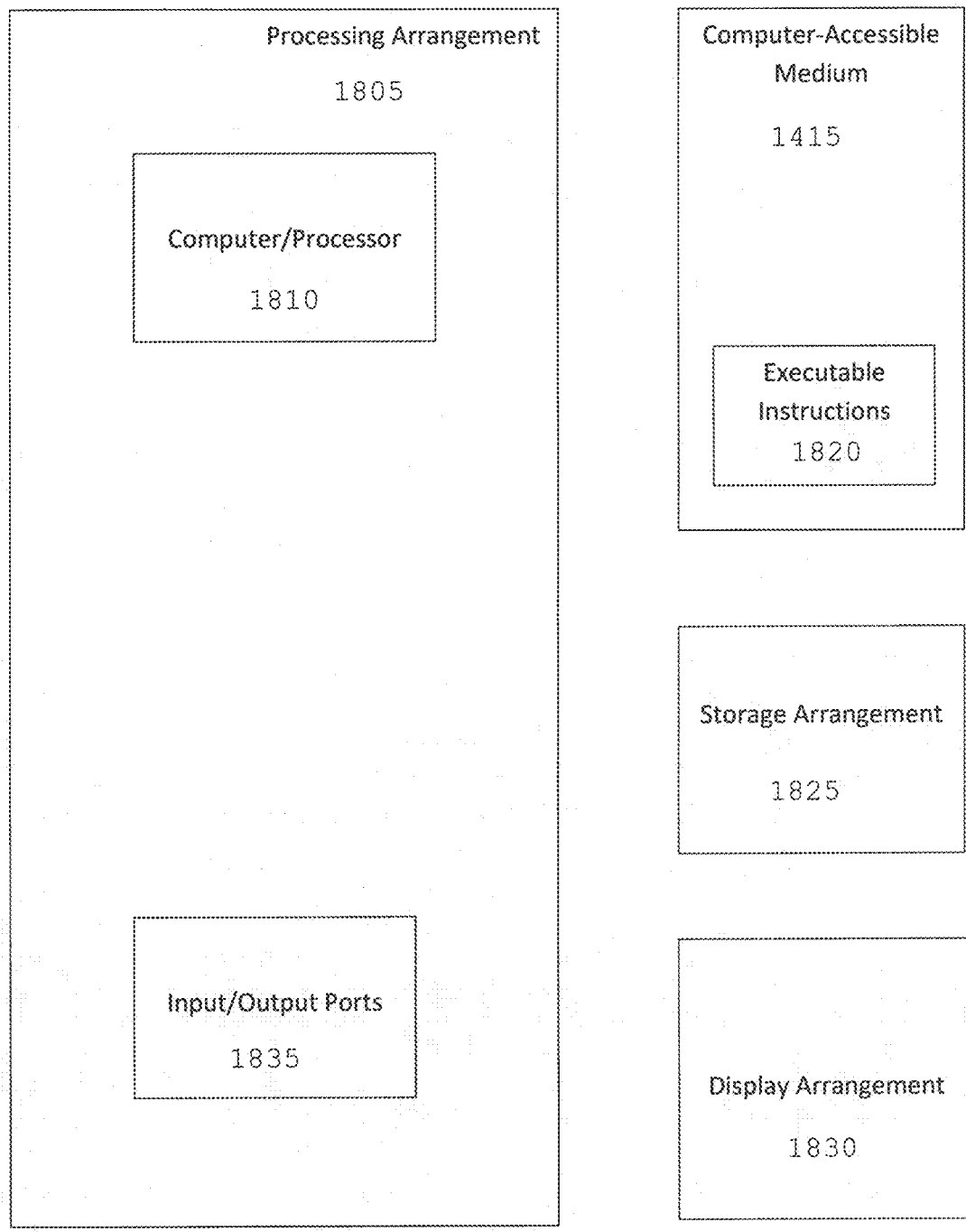
FIG. 18 is an illustration of an exemplary block diagram of an exemplary system in accordance with certain exemplary embodiments of the present disclosure.

FIG. 17 shows an exemplary flow diagram of a method 1700 for communicating within a multi-robot system according to an exemplary embodiment of the present disclosure. For example, at procedure 1705 first information related to presence of object within a predetermined distance using a sensor arrangement can be received. At procedure 1710, a query can be transmitted to the object using a communication arrangement. At procedure 1715, the object can be identified (i) as robot if a response is received or as a non-robot if no response is received. At procedure 1720, first map information can be generated. At procedure 1725, second map information obtained from the second robot can be received. At procedure 1730, a combined map can be generated based on the first and second map information FIG. 18 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 1805. Such processing/computing arrangement 1805 can be, for example entirely or a part of, or include, but not limited to, a computer/processor 1810 that can include, for example one or more microprocessors, and use instructions stored on a computer-accessible medium (e.g., RAM, ROM, hard drive, or other storage device).

As shown in FIG. 18, for example a computer-accessible medium 1815 (e.g., as described herein above, a storage device such as a hard disk, floppy disk, memory stick, CD-ROM, RAM, ROM, etc., or a collection thereof) can be provided (e.g., in communication with the processing arrangement 1805). The computer-accessible medium 1815 can contain executable instructions 1820 thereon. In addition or alternatively, a storage arrangement 1825 can be provided separately from the computer-accessible medium 1815, which can provide the instructions to the processing arrangement 1805 so as to configure the processing arrangement to execute certain exemplary procedures, processes, and methods, as described herein above, for example.

Further, the exemplary processing arrangement 1805 can be provided with or include an input/output ports 1835, which can include, for example a wired network, a wireless network, the internet, an intranet, a data collection probe, a sensor, etc. As shown in FIG. 18, the exemplary processing arrangement 1805 can be in communication with an exemplary display arrangement 1830, which, according to certain exemplary embodiments of the present disclosure, can be a touch-screen configured for inputting information to the processing arrangement in addition to outputting information from the processing arrangement, for example. Further, the exemplary display arrangement 1830 and/or a storage arrangement 1825 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

EXEMPLARY REFERENCES

The following references are hereby incorporated by reference in their entireties.

[1] G. Avinash and S. Mohan, "A review of research in multi-robot systems," *Proc. IEEE 7th Int. Conf. on Industrial and Information Systems (ICIIS)*, pp. 1-5, 2012.

[2] M. Brambilla et al., "Swarm robotics: A review from the swarm engineering perspective," *Swarm Intelligence*, vol. 7, no. 1, pp. 1-41, 2013.

[3] J. C. Barca and Y. A. Sekercioglu, "Swarm robotics reviewed," *Robotica*, vol. 31, no. 3, pp. 345-359, 2013.

[4] E. Şahin, "Swarm robotics: From sources of inspiration to domains of application," *Int. Workshop on Swarm Robotics, Lecture Notes in Computer Science*, vol. 3342, E. Şahin and W. M. Spears, Eds., Berlin, Germany: Springer-Verlag, pp. 10-20, 2004.

[5] Y. Tan and Z. Y. Zheng, "Research advance in swarm robotics," *Defence Technology*, vol. 9, no. 1, pp. 18-39, 2013.

[6] J. Krüger, T. K. Lien, and A. Verl, "Cooperation of human and machines in assembly lines," *CIRP Annals-Manufacturing Technology*, vol. 58, no. 2, pp. 628-646, 2009.

[7] E. Guizzo, "Three engineers, hundreds of robots, one warehouse," *IEEE Spectrum*, vol. 45, no. 7, 26-34, 2008.

[8] R. Bogue, "Growth in e-commerce boosts innovation in the warehouse robot market," *Industrial Robot: An Int. Journal*, vol. 43, no. 6, pp. 583-587, 2016.

[9] A. Faíña et al., "Towards an evolutionary design of modular robots for industry," *Foundations on Natural and Artificial Computation, Lecture Notes in Computer Science*, vol. 6686, J. M. Ferrández, et al., Eds., Berlin, Germany: Springer-Verlag, pp. 50-59, 2011.

[10] A. M. Naghsh et al., "Analysis and design of human-robot swarm interaction in firefighting," *Proc. IEEE Int. Symp. Robot and Human Interactive Communication (RO-MAN)*, pp. 255-260, 2008.

[11] R. R. Murphy, "Rescue robotics for homeland security," *Communications of the ACM*, vol. 47, no. 3, pp. 66-68, 2004.

[12] M. S. Couceiro et al., "A low-cost educational platform for swarm robotics," *Int. J. of Robots, Education and Art*, vol. 2, no. 1, pp. 1-15, 2012.

[13] Team in Flight, INTEL drones at the Olympic games, Available at: https://www.intel.com/content/www/us/en/sports/olympic-games/drones.html.

[14] J. Y. C. Chen and M. J. Barnes, "Human-agent teaming for multirobot control: A review of human factors issues," *IEEE Tran. on Human-Machine Systems*, vol. 44, no. 1, pp. 13-29, 2014.

[15] A. Kolling et al., "Human interaction with robot swarms: A survey," *IEEE Tran. on Human-Machine Systems*, vol. 46, no. 1, pp. 9-26, 2016.

[16] A. Kolling et al., "Towards human control of robot swarms," *Proc. ACM/IEEE int. conf. on Human-Robot Interaction (HRI)*, pp. 89-96, 2012.

[17] B. Khoshnevis and G. Bekey, "Centralized sensing and control of multiple mobile robots," *Computers and Industrial Engineering*, vol. 35, no. 3-4, pp. 503-506, 1998.

[18] C. Y. Wong et al., "A hierarchically structured collective of coordinating mobile robots supervised by a single human," *Software Design and Development: Concepts, Methodologies, Tools, and Applications*. Hershey, Pa.: IGI Global, pp. 1142-1164, 2014.

[19] J. T. Feddema, C. Lewis, and D. A. Schoenwald, "Decentralized control of cooperative robotic vehicles: Theory and application," *IEEE Tran. on Robotics and Automation*, vol. 18, no. 5, pp. 852-864, 2002.

[20] N. Sandell et al., "Survey of decentralized control methods for large scale systems," *IEEE Tran. on Automatic Control*, vol. 23, no. 2, pp. 108-128, 1978.

[21] M. S. Couceiro et al., "Benchmark of swarm robotics distributed techniques in a search task," *Robotics and Autonomous Systems*, vol. 62, no. 2, 200-213, 2014.

[22] M. C. De Gennaro and A. Jadbabaie, "Formation control for a cooperative multi-agent system using decentralized navigation functions," *Proc. IEEE American Control Conf.*, pp. 1346-1351, 2006.

[23] H. Sayama, "Decentralized control and interactive design methods for large-scale heterogeneous self-organizing swarms," *Advances in Artificial Life, Lecture Notes in Computer Science*, vol. 4648, F. Almeida e Costa et al., Eds., Berlin, Germany: Springer-Verlag, pp. 675-684, 2007.

[24] G. Beni and J. Wang, "Theoretical problems for the realization of distributed robotic systems," *Proc. IEEE Conf. Robotics and Automation (ICRA)*, vol. 3, pp. 1914-1920, 1991.

[25] Y. S. Pyo et al., *ROS Robot Programming*, Seoul, Republic of Korea: ROBOTIS Co., Ltd., 2017.

[26] P. Konstantinova, A. Udvarev, and T. Semerdjiev, "A study of a target tracking algorithm using global nearest neighbor approach," *Proc. Int. Conf. on Computer Systems and Technologies*, pp. 290-295, 2003.

What is claimed is:

1. A multi-robot system, comprising:
   at least one first robot comprising:
      a transceiver, and
      a sensor configured to detect a presence of at least one first object within a predetermined first distance from the at least one first robot, and determine a second distance from the at least one first robot to the at least one first object,
   wherein the at least one first robot broadcasts a query to the at least one first object using the transceiver, and identifies the at least one first object as at least one second robot or a non-robot based on at least one first response received from the at least one first object, and
   wherein, when the transceiver receives the at least one first response and at least one second response from at least one second object which provides a third distance from the at least one robot that has substantially the same value as the second distance, the at least one first robot is configured to:
      make a motion;
      determine a fourth distance from the at least one first robot to the at least one first object;
      broadcast an updated query to the at least one first object; and
      identify the at least one first object as at least one second robot or the non-robot based on at least one third response received from the at least one first object confirming the fourth distance.

2. The system of claim 1, wherein the sensor is a Light Detection and Ranging (LiDAR) sensor.

3. The system of claim 2, wherein the LiDAR sensor is a two-dimensional LiDAR sensor.

4. The system of claim 1, wherein the at least one first robot is an autonomous robot.

5. The system of claim 1, wherein the second distance is a Euclidean distance.

6. The system of claim 1, wherein the at least one first robot identifies the at least one first object as the at least one second robot if the at least one first response is received from the at least one first object.

7. The system of claim 6, wherein the at least one first response includes a first unique identification number for the at least one second robot, a second unique identification number of the at least one first robot, a confirmation of the second distance, a replying query number and a robot state.

8. The system of claim 7, wherein the robot state includes at least one of idling, exploring, charging, servicing, foraging, low-battery, inactive, or excavating.

9. The system of claim 1, wherein the at least one first robot identifies the at least one first object as the non-robot if no response is received from the at least one first object.

10. The system of claim 1, wherein the at least one first robot includes a unique identification number, and wherein the query includes the unique identification number.

11. The system of claim 1, wherein the query includes (i) a unique identification number of the at least one first robot, (ii) the second distance, (iii) an angle, and (iv) a query number.

12. The system of claim 1, wherein the at least one first robot is configured to store an identity of the at least one second robot if the at least one first response is received.

13. The system of claim 1, wherein the at least one first robot is further configured to:
   generate first map information;
   receive second map information obtained from the at least one second robot; and
   generate a combined map based on the first and second map information.

14. A non-transitory computer-accessible medium having stored thereon computer-executable instructions for communicating within a multi-robot system, wherein, when a computer system executes the instructions, the computer system is configured to perform procedures comprising:
   receiving first information related to a presence of at least one first object within a predetermined first distance using a sensor;
   transmitting a query to the at least one first object using a transceiver; and
   identifying the at least one first object (i) as at least one robot when at least one first response is received from the at least one first object or (ii) as a non-robot when no response is received from the at least one first object;
   wherein, when the transceiver receives the at least one first response and at least one second response from at least one second object which provides a third distance from the at least one robot that has substantially the same value as the second distance, the transceiver is configured to:
      broadcast an updated query to the at least one first object including a fourth distance; and
      identify the at least one first object as at least one robot or the non-robot based on at least one third response received from the at least one first object confirming the fourth distance.

15. The computer-accessible medium of claim 14, wherein the sensor is a two-dimensional Light Detection and Ranging (LiDAR) sensor.

16. The computer-accessible medium of claim 14, wherein the second distance is a Euclidean distance.

17. The computer-accessible medium of claim 14, wherein the query includes a unique identification number of a robot configured to run the computer-accessible medium.

18. The computer-accessible medium of claim 14, wherein the multi- robot system is a decentralized multi-robot system (DMRS).

19. The computer-accessible medium of claim 14, wherein the computer system is further configured to:
   generate first map information;
   receive second map information obtained from the at least one robot; and
   generate a combined map based on the first and second map information.

20. A method for communicating within a multi-robot system, comprising:
   receiving first information related to a presence of at least one first object within a predetermined first distance using a sensor;
   sending a query to the at least one first object using a transceiver; and
   using a computer hardware arrangement, identifying the at least one first object (i) as at least one robot when at least one first response is received from the at least one first object or (ii) as a non-robot when no response is received from the at least one first object;
   wherein, when the transceiver receives the at least one first response and at least one second response from at least one second object which provides a third distance from the at least one robot that has substantially the same value as the second distance, the transceiver is configured to:
      broadcast an updated query to the at least one first object including a fourth distance; and
      identify the at least one first object as at least one robot or the non-robot based on at least one third response received from the at least one first object confirming the third distance.

21. A system for communicating within a multi-robot system, comprising:
   a sensor configured to detect a presence of at least one first object within a predetermined first distance;
   a transceiver configured to transmit a query to the at least one first object; and
   a computer hardware arrangement configured to identify the at least one first object (i) as at least one robot when at least one first response is received from the at least one first object using the transceiver or (ii) as a non-robot when no response is received from the at least one first object;
   wherein, when the transceiver receives the at least one first response and at least one second response from at least one second object which provides a third distance from the at least one robot that has substantially the same value as the second distance, the transceiver is configured to:
      broadcast an updated query to the at least one first object including a fourth distance; and
      identify the at least one first object as at least one robot or the non-robot based on at least one third response received from the at least one first object confirming the fourth distance.

22. The system of claim 1, wherein the transceiver is configured to broadcast the query using radio frequency (RF) communication.

23. The system of claim 1, wherein the transceiver is configured to broadcast the query using long range radio frequency (RF) communication.

24. The system of claim 1, wherein the transceiver is configured to receive the first and second responses substantially simultaneously.

25. The system of claim 1, wherein the sensor is a 360-degree lidar.

26. The system of claim 1, wherein the at least one robot is further configured to identify whether the at least one object belongs to a list of authorized agents using a first unique identification number provided in the at least one first response.

* * * * *

UNITED STATES PATENT AND TRADEMARK OFFICE
CERTIFICATE OF CORRECTION

| | | |
|---|---|---|
| PATENT NO. | : 11,533,593 B2 | Page 1 of 1 |
| APPLICATION NO. | : 16/400422 | |
| DATED | : December 20, 2022 | |
| INVENTOR(S) | : Saiprasanth Krishnamoorthy and Vilkram Kapila | |

It is certified that error appears in the above-identified patent and that said Letters Patent is hereby corrected as shown below:

In the Specification

Please amend the second paragraph under Column 1, Lines 15-22 with the following paragraph:
STATEMENT REGARDING FEDERALLY SPONSORED RESEARCH
This invention was made with government support under EEC1542286, DRL1417769 and DRL1614085 awarded by the National Science Foundation. The government has certain rights in the invention.

This certificate supersedes the Certificate of Correction issued May 1, 2019.

Signed and Sealed this
Fourteenth Day of October, 2025

John A. Squires
*Director of the United States Patent and Trademark Office*